(12) United States Patent
Steenson, Jr. et al.

(10) Patent No.: US 12,176,930 B2
(45) Date of Patent: Dec. 24, 2024

(54) METHOD FOR RAPID BASELINE RECOVERY FOR IRREGULAR FREQUENCY CONTENT LARGE DYNAMIC RANGE UNIPOLAR DATA SIGNALS

(71) Applicant: BAE Systems Information and Electronic Systems Integration Inc., Nashua, NH (US)

(72) Inventors: James H. Steenson, Jr., Hudson, NH (US); Joseph P. Cullen, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 51 days.

(21) Appl. No.: 17/815,164

(22) Filed: Jul. 26, 2022

(65) Prior Publication Data

US 2024/0039563 A1    Feb. 1, 2024

(51) Int. Cl.
*H04B 1/00*           (2006.01)
*H04B 1/16*           (2006.01)

(52) U.S. Cl.
CPC ........... *H04B 1/001* (2013.01); *H04B 1/0014* (2013.01); *H04B 1/16* (2013.01)

(58) Field of Classification Search
CPC ..................................................... H04B 1/001
USPC ......................................................... 375/350
See application file for complete search history.

(56) References Cited

U.S. PATENT DOCUMENTS

| | | | |
|---|---|---|---|
| 5,345,342 A | 9/1994 | Abbott et al. | |
| 5,659,585 A * | 8/1997 | Meyer | H03H 17/02 708/212 |
| 6,133,784 A | 10/2000 | Gregoire | |
| 10,340,926 B2 * | 7/2019 | Chillara | H03L 7/104 |
| 2003/0227966 A1 * | 12/2003 | Im | H03H 7/1758 375/222 |
| 2006/0248138 A1 * | 11/2006 | Tanaka | G01R 19/2506 708/800 |
| 2014/0347034 A1 | 11/2014 | Yamada et al. | |

OTHER PUBLICATIONS

Razavi,Behzad, "The Decision-Feedback Equalizer," IEEE Solid-State Circuits Magazine, 2017. pp. 13-16 and p. 132.
International Search Report, PCT/US23/28106, mailed Dec. 11, 2023, 10 pages.

* cited by examiner

*Primary Examiner* — Lihong Yu
(74) *Attorney, Agent, or Firm* — Gary McFaline

(57) ABSTRACT

Techniques to dynamically adjust the corner frequency of a high-pass filter in response to a time-domain amplitude value of an output signal, thereby preserving accuracy while promptly recovering the signal's baseline value. A system can be configured to filter frequency-domain values of an input signal based on a filtering characteristic. The filtering characteristic can be set dynamically in response to a time-domain value of an amplitude of an output signal. The filtering characteristic can comprise a corner frequency, and the system can include a high-pass filter configured to filter out frequency components at frequencies lower than the corner frequency. The system is configured to dynamically change the corner frequency from a first value to a second value, in response to the time-domain value of the amplitude crossing a threshold value. The system may dynamically change the corner frequency within a time interval after the crossing.

11 Claims, 16 Drawing Sheets

METHOD FOR RAPID BASELINE RECOVERY FOR IRREGULAR FREQUENCY CONTENT LARGE DYNAMIC RANGE UNIPOLAR DATA SIGNALS

STATEMENT OF GOVERNMENT INTEREST

This invention was made with United States Government assistance under Contract No. N00019-16-G-0021/N00019-19-F-0019, awarded by the United States Government. The United States Government has certain rights in this invention.

BACKGROUND

Incoming signal processing data from many systems frequently includes unipolar signals with irregular shapes, irregular data spacing, large dynamic range, and possibly also a constant component (which may also be referred to as a continuous, direct current, or DC component of the signal). For signal processing, it is often desired to filter out the constant portion of the signal, so as to set a "zero" baseline from which data, such as a unipolar signal, is measured. As a result of such filtering, engineers or signal processing technicians can then direct processing and analysis efforts to the relevant higher-frequency data content. Thus, a simple, versatile signal processing technique is to filter an incoming signal with a high-pass filter (HPF) or another filter, thereby setting a baseline for high-frequency content data analysis. However, there remain a number of non-trivial issues associated with such filtering when unipolar data signals are being considered.

SUMMARY

In an example, a system is provided, comprising: a filter circuit, a corner-frequency adjust-up circuit, a corner-frequency adjust-down circuit, and a selector circuit. The filter circuit can have an input and an output, and can be configured to filter, based on a corner frequency, an input signal received from the input of the filter circuit, and send the filtered input signal to the output of the filter circuit. The corner-frequency adjust-up circuit can be configured to raise the corner frequency. The corner-frequency adjust-down circuit can be configured to lower the corner frequency. The selector circuit can be coupled to the output of the filter circuit, and to one or both of the corner-frequency adjust-up circuit and the corner-frequency adjust-down circuit. The selector circuit can be configured to select the corner-frequency adjust-up circuit or the corner-frequency adjust-down circuit based on the filtered input signal. In some cases, the filter circuit comprises a high-pass filter, and to filter the input signal based on the corner frequency comprises to filter out frequency components at frequencies lower than the corner frequency. In some cases, the filter circuit comprises a low-pass filter, and to filter the input signal based on the corner frequency comprises to filter out frequency components at frequencies higher than the corner frequency. In some cases, the selector circuit comprises: a threshold value terminal or node, a switch, and a comparator. The switch can have a first terminal coupled to the output of the filter circuit, a second terminal coupled to one or both of the corner-frequency adjust-up circuit and the corner-frequency adjust-down circuit, and a control input. The comparator can have a first comparator input, a second comparator input, and a comparator output, the first comparator input coupled to the output of the filter circuit, the second comparator input coupled to the threshold value terminal or node, and the comparator output coupled to the control input of the switch. In some cases, to select between the corner-frequency adjust-up circuit and the corner-frequency adjust-down circuit based on the filtered input signal comprises to switch between the corner-frequency adjust-up circuit and the corner-frequency adjust-down circuit in response to the filtered input signal crossing a threshold value present at the threshold value terminal or node. To switch between the corner-frequency adjust-up circuit and the corner-frequency adjust-down circuit in response to the filtered input signal crossing the threshold value can comprise to switch based on a comparison, by the comparator, of the filtered input signal to a threshold voltage corresponding to the threshold value, between the corner-frequency adjust-up circuit and the corner-frequency adjust-down circuit. In some cases, the selector circuit comprises a multiplexer having a first terminal coupled to the corner-frequency adjust-up circuit, the corner-frequency adjust-up circuit configured to perform a first bit shift, a second terminal coupled to the corner-frequency adjust-down circuit, the corner-frequency adjust-down circuit configured to perform a second bit shift and a control input coupled to a comparison circuit, the comparison circuit configured to perform a comparison of the filtered input signal to a threshold value. To select between the corner-frequency adjust-up circuit and the corner-frequency adjust-down circuit based on the filtered input signal can comprise to select, by the multiplexer and based on the control input, between the corner-frequency adjust-up circuit and the corner-frequency adjust-down circuit.

In another example, a system is provided, which is configured to filter frequency-domain values of an input signal based on a filtering characteristic. The filtering characteristic can be set dynamically in response to a time-domain value of an amplitude of an output signal. In some cases, the filtering characteristic comprises a corner frequency, and the system includes a high-pass filter configured to filter out frequency components at frequencies lower than the corner frequency. In some cases, the system is configured to dynamically change the corner frequency from a first value to a second value, in response to the time-domain value of the amplitude falling below a threshold value, the second value being greater than the first value. In some cases, the system is configured to dynamically change the corner frequency from a first value to a second value, in response to the time-domain value of the amplitude rising above a threshold value, the second value being lower than the first value. In some cases, the system is configured to dynamically change the corner frequency within a time interval after the time-domain value of the amplitude crosses a threshold value. In some cases, the time interval is 3 clock ticks of a system clock, or less. In some cases, the time interval is 1 clock tick of a system clock, or less. In some cases, the time interval is less than 1 microsecond. In some cases, the time interval is sufficiently short that a signal baseline is preserved, allowing unipolar data measurement consistent with application requirements. In some cases, the time interval is sufficiently short, in that a signal baseline is preserved allowing unipolar data measurement consistent with a predetermined accuracy threshold. In some cases, the system is a multi-channel system. The amplitude can be a respective amplitude of a plurality of amplitudes corresponding to a plurality of signals. The system can be configured, responsive to a respective value of any of the plurality of amplitudes crossing a threshold value, to set the filtering characteristic. In some cases, the output signal is a digital output signal. To filter the frequency-domain values can comprise, for example, to bit shift the digital output signal. In some cases, the system comprises a multiplexer configured to dynamically select a bit shift value based on the amplitude of the output signal. In some cases, the output signal is an analog output signal. To set the filtering characteristic can comprise to set a switch state (e.g., of a transistor or another switch) based on an output of a comparator comparing the time-domain value of the amplitude with a threshold voltage. Other filter types can be used. For example, in some cases, the filtering characteristic comprises a corner frequency, and the system includes a low-pass filter configured to filter out frequency components at frequencies higher than the corner frequency.

In another example, a method of filtering frequency-domain values is provided, which includes setting a filtering characteristic dynamically in response to a time-domain value of an amplitude of an output signal and filtering frequency-domain values of an input signal based on the dynamically-set filtering characteristic. In some cases, the input signal is a digital input signal received by a computing device. Setting the filtering characteristic dynamically may comprise setting, by the computing device, the filtering characteristic dynamically. Filtering frequency-domain values of the input signal may comprise filtering, by the computing device, frequency-domain values of the input signal.

In some cases, computer instructions may be configured to perform a high-pass filtering method with a variable filtering characteristic. The variable filtering characteristic may be adjusted dynamically in response to a time-domain value of an amplitude of an output signal of the high-pass filtering method. The variable filtering characteristic may comprise a variable corner frequency.

In another example, a system having a first input channel and a second input channel is provided. The system can be configured to filter frequency-domain values of a first input signal and a second input signal based on a filtering characteristic. The filtering characteristic can be set dynamically in response to time-domain values of amplitudes of a first output signal and a second output signal of the system.

DETAILED DESCRIPTION

Figure 1:
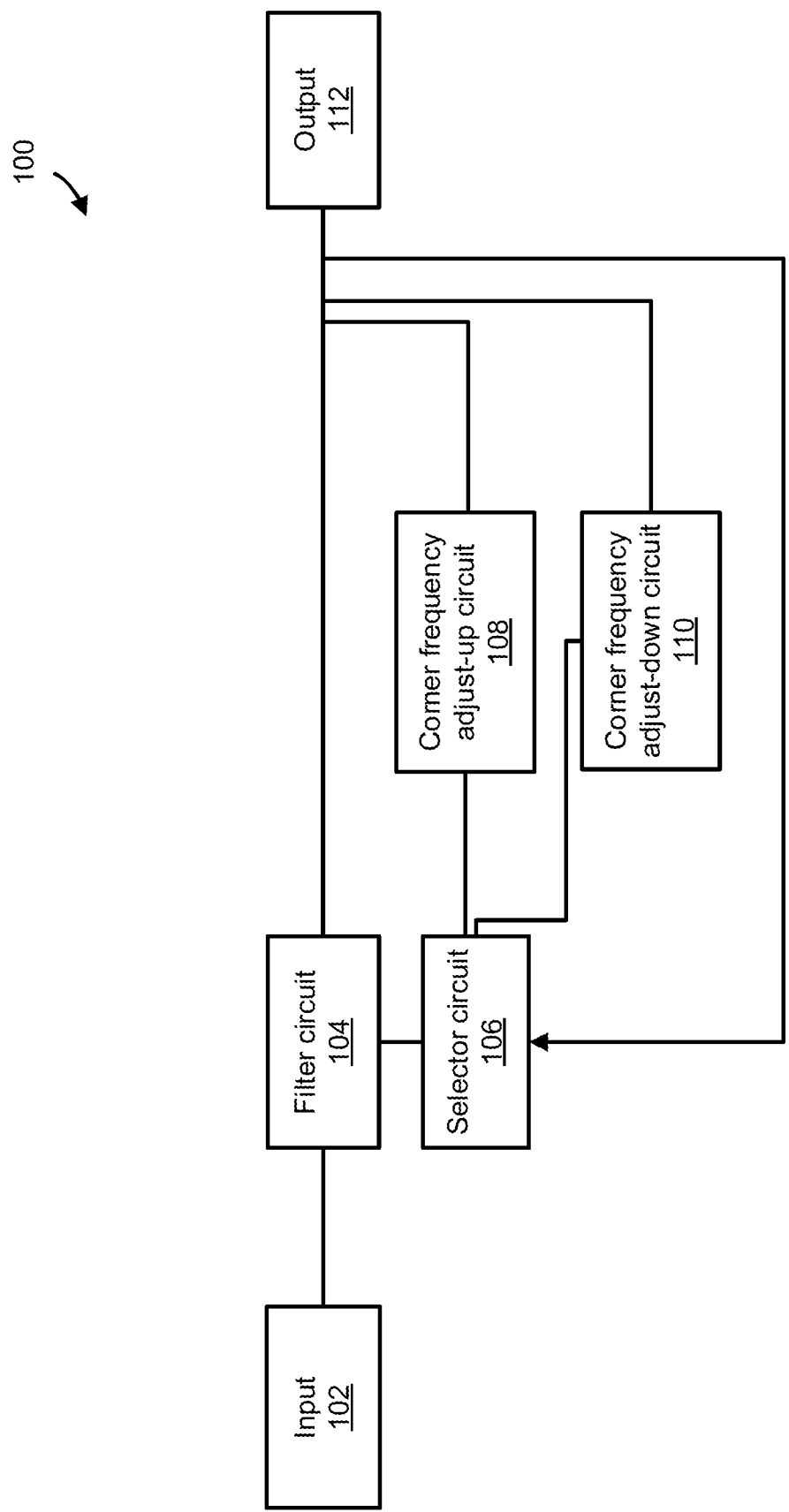
FIG. 1 is a block diagram illustrating the architecture of a system configured to filter frequency-domain values of an input signal, in accordance with an example of the present disclosure.

Techniques are disclosed to dynamically adjust the corner frequency of a filter, such as a high-pass filter (HPF), in response to a signal's time-domain data content. Thus, the disclosed techniques can be used to preserve data accuracy while promptly recovering the signal's baseline value, even in the case of signals with high dynamic ranges. Moreover, the disclosed techniques can be used to avoid the need for other filtering stages that often introduce spurious low-frequency artifacts.

In some examples, the disclosed techniques can be implemented in a system that filters frequency-domain values of an input signal based on a filtering characteristic. The filtering characteristic can be set dynamically in response to a time-domain value of an amplitude of the output signal. The filtering characteristic can comprise a corner frequency, and the system can include, for instance, a high-pass filter configured to filter out frequency components at frequencies lower than the corner frequency. The system is configured to dynamically change the corner frequency from a first value to a second value, in response to the time-domain value of the amplitude crossing a threshold value.

General Overview

As explained above, incoming signal processing data from many systems frequently includes unipolar signals with irregular shapes, irregular data spacing, large dynamic range, and possibly also a constant or DC component. In signal processing, for example in DSP, it is often desirable to eliminate the constant portion of the signal, and thereby create a "zero" baseline from which data is measured. Engineers or signal processing technicians can then focus processing and analysis efforts on the remaining higher-frequency data content. Thus, a versatile, effective signal processing technique is to filter an incoming signal with an HPF, so as to set a "zero" baseline for high-frequency content data analysis. However, the proper selection of a cutoff frequency for HPF (also referred to as a corner frequency or pole) may be complicated when the data's frequency content is inconsistent. For example, in some cases, corner frequencies that are too high may recover the signal's baseline value quickly, but may filter out some potentially important components of the signal of interest, resulting in processing inaccuracies. In other cases, corner frequencies that are too low may recover the baseline value slowly, resulting in the potential loss or degraded accuracy of acquired data due to inappropriate baseline position.

Thus, and according to some embodiments, techniques and systems are provided herein that can dynamically adjust the corner frequency of an HPF, low-pass filter, bandpass filter, or other filter in response to the data content, preserving data accuracy even while promptly recovering the signal's baseline value, including in the case of signals with high dynamic ranges. The disclosed system and methods can be used, for instance, to solve critical data acquisition challenges by recovering the baseline significantly faster, thereby reducing the time for the system to be ready for the next signal, and preserving or even increasing signal quality. The system can also be used to avoid the necessity of other filtering stages that often introduce spurious low-frequency artifacts. The system is useful, for instance, when the data frequency content or rate of occurrence vary, or are necessarily close to the bandwidth of the HPF. Accordingly, the disclosed system and methods could have wide application in the field of Digital Signal Processing (DSP).

System Architecture

FIG. 1 is a block diagram illustrating the architecture of a system 100 configured to filter frequency-domain values of an input signal, in accordance with an example of the present disclosure. In this example, system 100 includes an input line 102, a filter circuit 104, a selector circuit 106, a corner frequency adjust-up circuit 108, a corner frequency adjust-down circuit 110, and an output line 112. The input line 102 can receive an input signal. For example, the input signal may include unipolar data and/or may have an irregular shape, irregular data spacing, large data dynamic range, and/or a constant DC component, as discussed above. Accordingly, the input signal 102 can be filtered by filter circuit 104. The filter circuit 104 may include, for example, an HPF that filters out components of the signal with frequencies below a cutoff frequency, which may also be referred to as a corner frequency or a pole. In some embodiments, the cutoff frequency's value can be dynamically adjusted based on a time-domain value of the output signal 112. In various examples, the filter circuit 104 can include another type of filter, such as a low-pass filter, a bandpass filter, or some other filter.

In some embodiments, the selector circuit 106, which may include a unipolar data arrival detector, can select a value of the cutoff frequency based on the output signal 112. For example, in some cases, cutoff frequencies that are too high may result in processing inaccuracies. In other cases, cutoff frequencies that are too low may recover the signal's baseline value slowly. Accordingly, the selector circuit 106 can adjust the level of the cutoff frequency to prevent these issues, in response to a time-domain value of the output signal 112. For example, the selector circuit 106 can monitor the output to decide when the unipolar data has arrived, thus making it advantageous to switch corner frequencies. In this example, the selector circuit 106 lies on a parallel or alternate path between the filter circuit 104 and the output 112.

In some examples, the selector circuit 106 can select a parallel branch of the circuit 100 containing either corner frequency adjust-up circuit 108 or corner frequency adjust-down circuit 110. In particular, corner frequency adjust-up circuit 108 can raise the value of the HPF's cutoff frequency, while corner frequency adjust-down circuit 110 can lower the value of the cutoff frequency, as disclosed herein.

In some examples, the selector circuit 106 selects a branch based on a comparison of the output signal 112 to a threshold, as disclosed herein. Because the output 112 of the filter has a zero baseline, such a comparison to a threshold is both meaningful and practical. By contrast, the input signal 102 may retain a DC component, and therefore cannot be compared meaningfully to a threshold.

In this example, the system 100 provides two alternative options for the cutoff frequency, depending on the branch selected by selector circuit 106. However, in some cases, the system may have any number of alternative values, for example three. In addition, the system may provide a disable control, which a user can select to fix the corner frequency to a static value, as described below. Note that such a static value may have a value different from the values in branches 108 and 110.

Finally, after a cutoff frequency corresponding to branch 108 or 110 has been selected by the selector circuit 106, the input signal can be filtered by the filter circuit 104, and the resulting filtered signal can be output to the output line 112.

Circuit Details

Figure 2A:
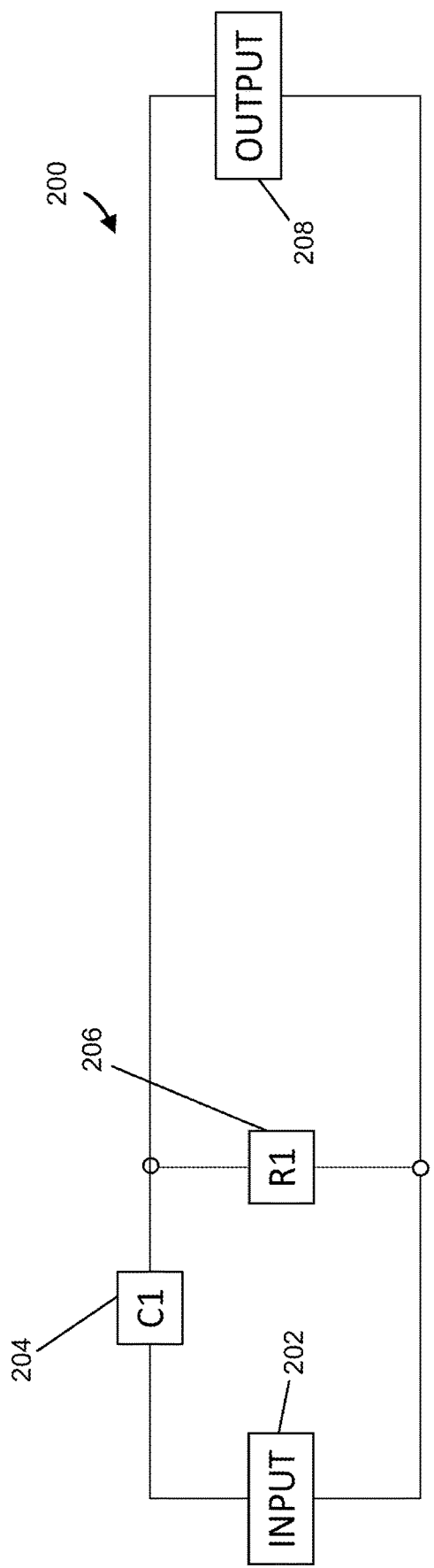
FIG. 2A is a circuit diagram illustrating details of an analog high-pass filter circuit.

FIG. 2A is a circuit diagram illustrating details of an analog high-pass filter circuit 200. Analog HPF circuit 200 can filter out frequency-domain components of a signal from input line 202 that have frequencies below a cutoff or corner frequency. In this example, circuit 200 can drop the voltage from input 202 across the RC combination of a capacitor 204, having capacitance C, and a resistor 206, having resistance R. The output 208 is equivalent to the voltage across resistor 206.

The cutoff or corner frequency is related to the time constant $\tau=1/RC$ of the resistor and capacitor combination, that is, it is related to the charging time of the capacitor 204. In particular, current can continue to flow in circuit 200 when capacitor 204 is only partially charged, since the magnitude of the voltage drop $V_C=Q/C$ across capacitor 204 is less than the voltage from input 202. For frequencies well above the corner frequency (for example, for frequencies greater than 170% of the corner frequency, 200% of the corner frequency, or 400% of the corner frequency), the voltage changes sign before the capacitor 204 can fully charge, and therefore the magnitude of $V_C$ always remains smaller than the input voltage.

Accordingly, alternating current can flow continuously in response to high-frequency input signals (for example, for frequencies greater than 170% of the corner frequency, 200% of the corner frequency, or 400% of the corner frequency). By contrast, for frequencies well below the corner frequency (for example, for frequencies less than 90% of the corner frequency, 50% of the corner frequency, or 25% of the corner frequency), the capacitor 204 has time to charge fully, so the output signal will attenuate the input signal after times of order $\tau$. Thus, circuit 200 represents an analog realization of an HPF, while digital realizations are also possible, as in the example of FIG. 2B.

Figure 2B:
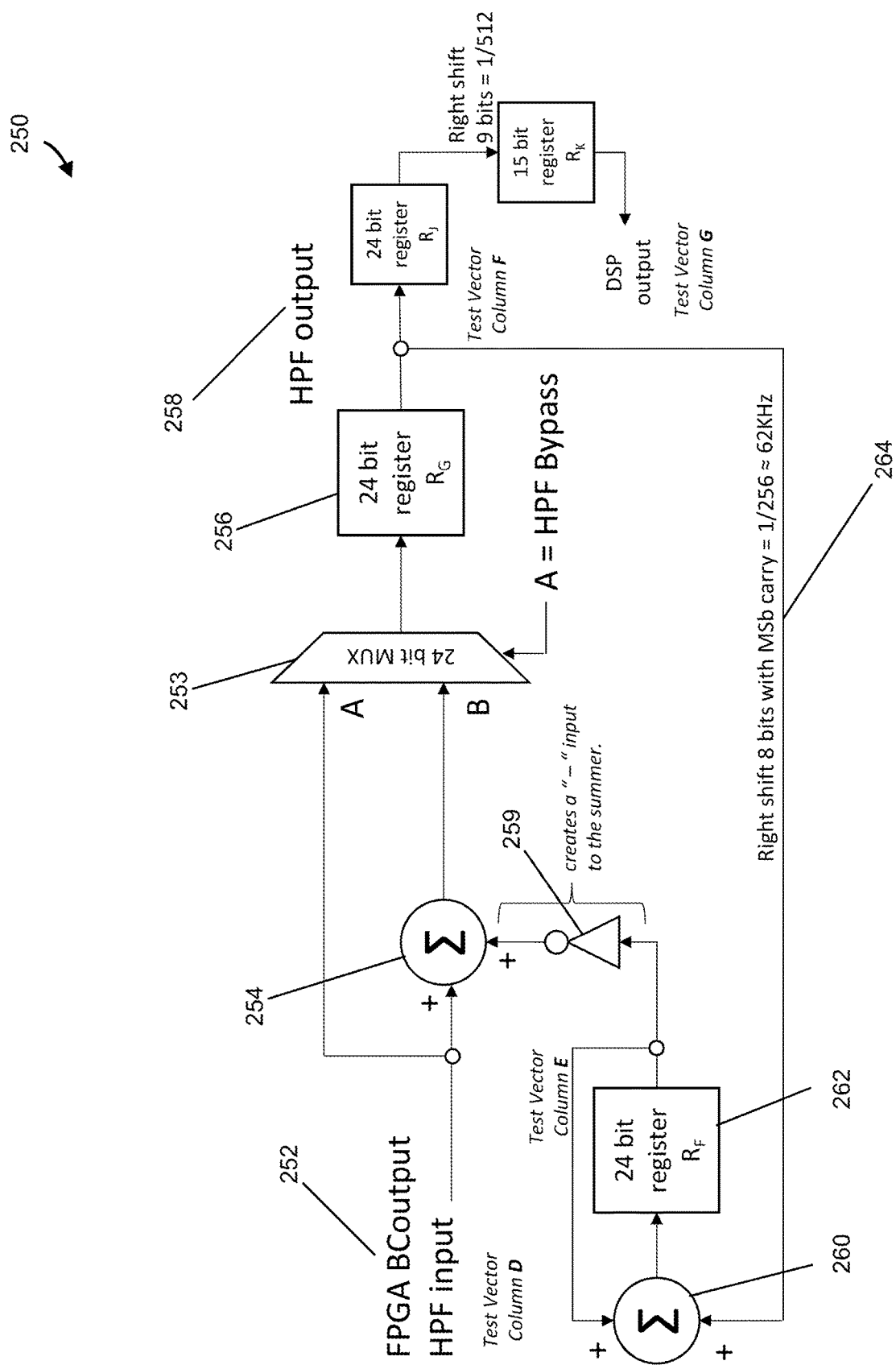
FIG. 2B is a circuit diagram illustrating details of a digital high-pass filter circuit.

FIG. 2B is a circuit diagram illustrating details of a digital HPF circuit 250. Digital HPF circuit 250 can filter out frequency-domain components of a signal from input line 252 with frequencies below a cutoff or corner frequency. As described above, the HPF 250 may be used to eliminate DC and lower frequency components of the input signal for high-frequency content data analysis, thereby creating a "zero" or otherwise corrected or adjusted baseline from which data is measured. In some embodiments, the disclosed system and methods can use a different type of filter to filter out other ranges of frequency components. For example, the system may use a low-pass filter to filter out frequencies above a cutoff frequency, or may use a bandpass filter to filter out frequencies outside of a band or range. While HPF circuit 250 is an implementation of an HPF circuit with digital electronics, in some examples, the system can use an HPF or another filter implemented with analog electronics, or with both digital and analog electronics.

In some examples, the HPF 250 can make use of spectral inversion, which involves subtracting the output of a low-pass filter to achieve high-pass filtering. That is, since the output of a low-pass filter is the low-frequency components of the original input signal, subtracting the low-pass output from the original input leaves only the high-frequency components. In some examples, the HPF 250 can make use of an Infinite Impulse Response (IIR) spectral inversion filter.

In some examples, HPF 250 may be an integer filter that can only process integer-valued signals. However, in each time step, the HPF 250 may output a fraction of the previous output and the present input. As a result, in order to maintain numerical accuracy, it may be necessary to scale up an input signal to a large integer, then subsequently scale the output down after filtering. Accordingly, the HPF may make use of a scale factor K, achieved by right bit-shifting 264 the signal, to set the corner frequency. The scale up is not shown in the example of FIG. 2B, and may occur, for example, in a previous low-pass filter stage. In some examples, the HPF 250 may use K=1/256, or a right shift 264 of 8 bits, as described below. Alternatively, in some examples, rather than an integer implementation, the HPF 250 may be implemented via a floating-point digital circuit, an analog circuit, or the like, and the scale up and scale down may be unnecessary.

In some examples, the corner frequency of the HPF 250 may be related to the scale factor K and the system's clock period dt. For example, the corner frequency may approximately equal $K/((1-K) 2\pi dt)$. For example, for a right shift 264 of 8 bits and a clock period dt=10 ns, the corner frequency may be approximately 62 kHz. The tolerance on the corner frequency may vary from one example to the next. In some example cases, the tolerance is symmetrical, such as ±10%, ±6%, ±4%, or ±2%. In other cases, the tolerance may be asymmetrical, such as −6%/+4%.

In some examples, the HPF circuit 250 can include a bypass multiplexer 253, which may select a circuit branch based on an HPF bypass signal. In this example, if the HPF bypass signal selects branch A, the HPF functionality of circuit 250 may be bypassed. If the HPF bypass signal selects branch B, the HPF functionality of circuit 250 may be active, that is, the circuit 250 may perform high-pass filtering, as described in this example.

In this example, if the HPF bypass signal selects branch B, the input signal 252 may be summed in adder 254 (which may also be referred to herein as a summer) together with the signal from the lower branch of the circuit 250 in FIG. 2B. Next along the upper branch of the circuit 250, the input signal 252 may pass through the register 256 before being output to the output line 258 of the HPF circuit 250. In some examples, the registers herein may refer to 1/Z blocks, where Z is an impedance. Note that in some examples, register 256 may be a 24 bit register. Alternatively, any other registers may be used.

In some examples, the circuit 250 may also include one or more additional registers, which may cause a delay in the final output, for example a delay of one clock cycle.

As can be seen in the lower branch, the inverter 259 can be used to perform subtraction in adder 254. For example, the inverter 259 can invert its input signal by taking the two's complement of the signal. Continuing along the lower branch of the circuit 250, the output of the adder 260 and register 262 can form the signal to be inverted by inverter 259.

Feedback path 264 of circuit 250 can carry the bit-shifted output of register 256. For example, feedback path 264 can apply a bit shift, such as a right arithmetic shift by 8 bits with carry of the most significant bit (MSb), i.e. with the MSb reintroduced from the left. In some examples, the bit shift may be a right shift of a two's compliment number of the signal. Note that the bit shift 264 may take place between the register 256 and the adder 260. In some examples, the MSb carry is needed because the value being shifted (the HPF output) can be negative. Accordingly, the system can use MSb carry, which may correspond to right shifting the two's compliment value. This bit shift can correspond to division of the signal amplitude by $2^8$=256, and results in an HPF cutoff frequency. For example, for a system clock rate of 100 MHz (i.e., a ns clock period), division by $2^8$ can correspond to an HPF cutoff frequency of approximately 62 kHz.

As a result, the HPF circuit 250 can filter out frequencies below the cutoff frequency from the input signal 252, and can output the filtered signal to the HPF output line 258. The HPF 250 can be useful for signal processing, such as DSP, in order to eliminate the constant or DC portion of the signal, and thereby shift the signal's baseline to zero (e.g., by removing a DC offset, if present).

As described above, optimal selection of an HPF corner frequency may be complicated when the data's frequency content is inconsistent. For example, in some cases, high corner frequencies may filter out potentially important components of a signal, whereas low corner frequencies may recover the signal's baseline value slowly. The disclosed system and methods can address these challenges. For example, the dynamic HPF circuits of the examples of FIGS. 3A and 3B below can dynamically adjust the corner frequency in response to the data content. In addition to dynamic HPFs, in some examples, dynamic low-pass filters, dynamic bandpass filters, or other dynamic filters are also possible.

Figure 3A:
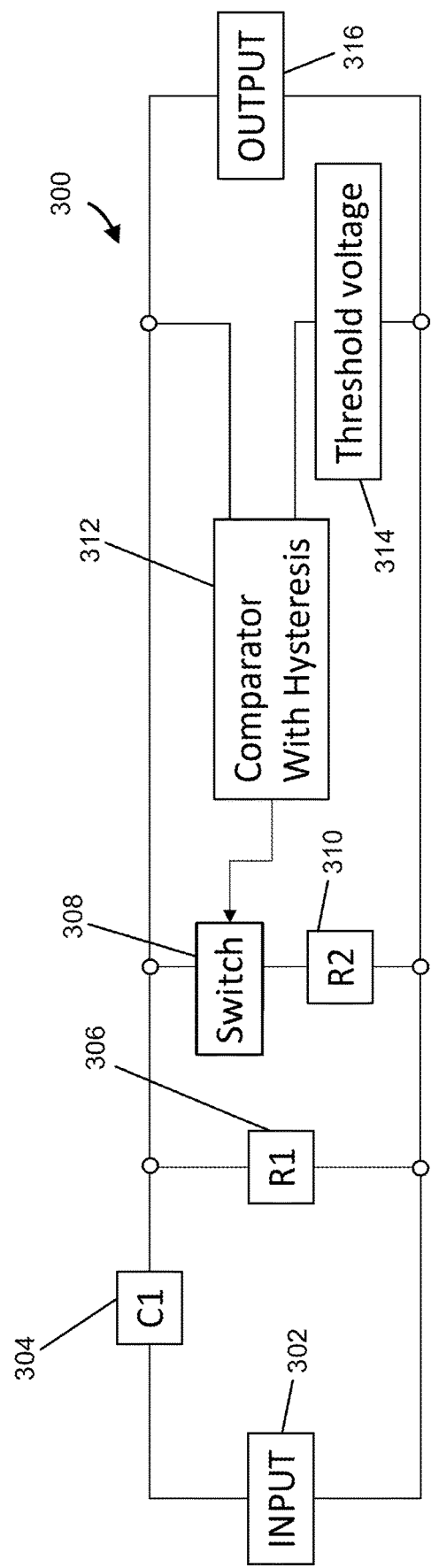
FIG. 3A is a circuit diagram illustrating details of a dynamic analog high-pass filter circuit, in accordance with an example of the present disclosure.

FIG. 3A is a circuit diagram illustrating details of a dynamic analog high-pass filter circuit 300, in accordance with an example of the present disclosure. Like circuit 200 of the example of FIG. 2A above, circuit 300 drops the voltage from input 302 across the RC combination of capacitor 304 and resistor 306. Circuit 300 also includes additional components in parallel with resistor 306, such as switch 308 (e.g., a field effect transistor (FET)), second resistor 310, comparator 312 with hysteresis, and threshold voltage signal 314.

The comparator 312 may compare the output voltage 316 (e.g., as measured or sensed from an output terminal or node) with the threshold voltage 314 (e.g., present at a threshold reference terminal or node). In some examples, the comparator 312 may compare the voltage across resistor 306, which may be equivalent to the output voltage 316, with the threshold voltage 314. If the signal is less than the threshold voltage 314, the comparator 312 can switch on the switch 308, such that resistor 310 is placed in parallel with resistor 306, thereby lowering the net resistance in series with the capacitor 304. This, in turn, will reduce the time constant t=1/RC and raise the cutoff frequency, since the capacitor 304 can charge faster with more current flowing through circuit 300. If, instead, the signal is larger than threshold voltage 314, the comparator 312 can switch off the switch 308, in order to raise the net resistance and lower the cutoff frequency.

In an example, the switch 308 may be a FET. However, in some other examples, instead of a FET, the circuit 300 may make use of another type of switch 308. For example, any switch 308 that can respond fast enough to changes in the output signal amplitude by switching may be used. For example, an analog switch, a relay, a vacuum switch, or another switch may be used as the switch 308. In some examples, a fast enough response may refer to switching the corner frequency within a short enough time interval so as to preserve the signal's baseline, and thereby ensure accurate measurement. In some examples, the desired level of accuracy may be a function of the performance needs of a particular application. Accordingly, in some cases, a trade-off or optimization may be made between corner frequency selection and the switching time interval. For example, depending on the performance needs of the application, the time interval may be 3 clock ticks of a system clock or less, 1 clock tick of a system clock or less, 1 microsecond or less, or may be any other time period or interval.

As noted above, in various examples, the disclosed system and methods may be designed with the time interval sufficiently short, in that a signal baseline is preserved allowing unipolar data measurement consistent with application requirements and/or a predetermined accuracy threshold, which may be based on such application requirements. In an example where such a performance and/or accuracy threshold is looser, a longer time interval may be chosen, thereby enabling the use of a lower corner frequency. For example, for some precision guidance and sensing applications, a very high performance and/or accuracy may be required, such that the time interval is 1 clock tick of a system clock, or less. In another example, the disclosed system and methods may be implemented within a mechanical shock absorption system, therefore the time interval may be 100 milliseconds or 10 milliseconds. In yet another example, the disclosed system and methods may be used to filter radio-frequency data, and therefore the time interval may be of order 100 nanoseconds or 10 nanoseconds.

As shown, the comparator 312 may include hysteresis to reduce the chance of oscillation of the cutoff frequency due to noise fluctuations. In an embodiment, the hysteresis in the comparator 312 can be very small, for example the hysteresis may be only marginally sufficient to prevent oscillation in a condition of zero input noise.

Because the comparator 312 of circuit 300 can adjust the cutoff frequency dynamically in response to the input signal, dynamic analog HPF circuit 300 can filter the input signal while still preserving the accuracy of the signal above the cutoff frequency, and providing prompt recovery of the signal's baseline value. In particular, when the input signal is larger than the threshold voltage 314, circuit 300 can set a low cutoff frequency so that most frequency components of the input signal are retained, and thus the shape and quantitative value of the signal are likely preserved. Conversely, when the input signal is below the threshold voltage 314, dynamic HPF circuit 300 may set a high cutoff frequency so that lower-frequency (longer-period) artifacts are filtered out, leading to faster baseline recovery.

Figure 3B:
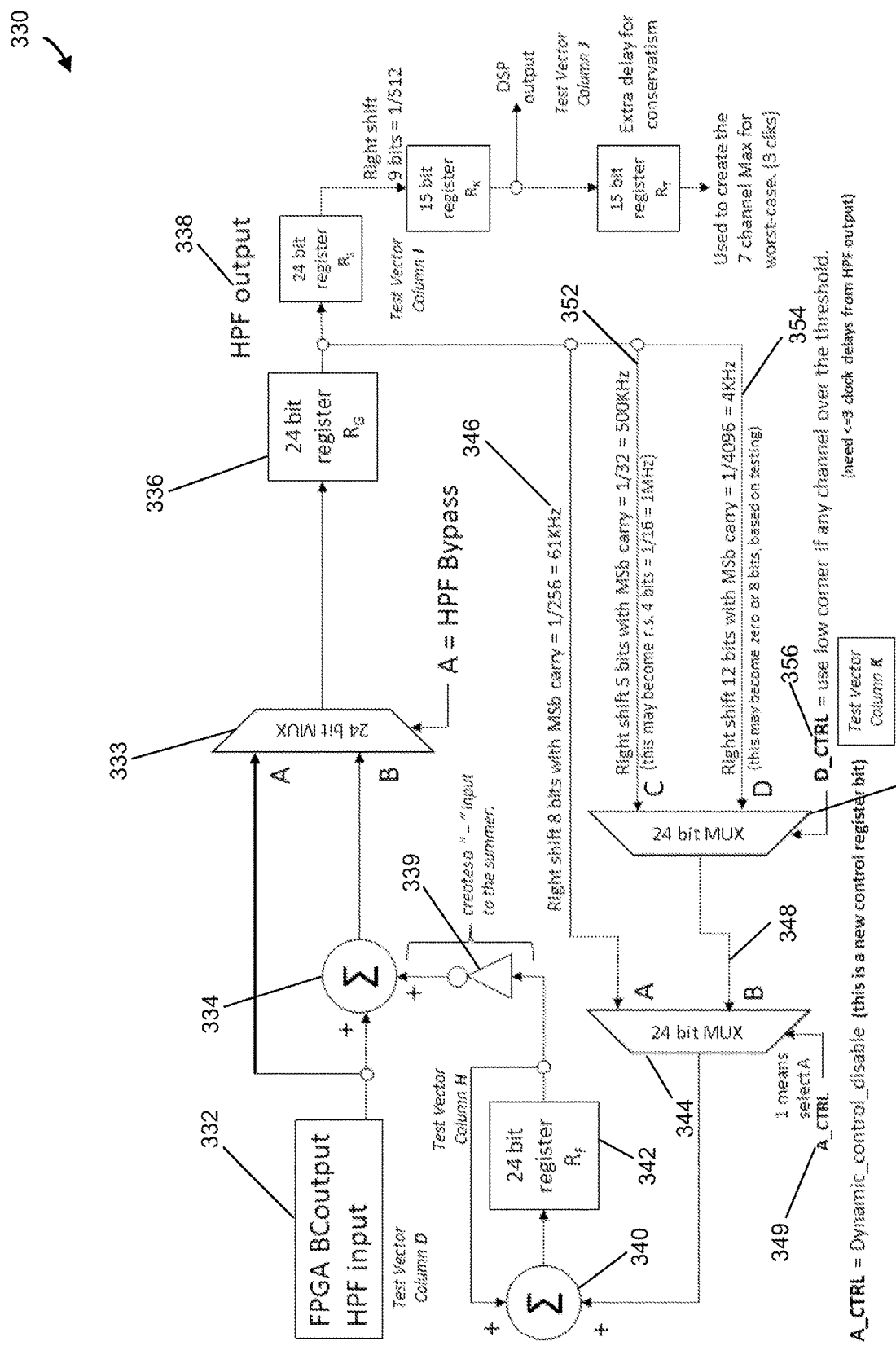
FIG. 3B is a circuit diagram illustrating further details of a high-pass filter circuit configured to set a filtering characteristic dynamically in response to a time-domain value of an amplitude of an output signal, in accordance with an example of the present disclosure.

FIG. 3B is a circuit diagram illustrating further details of an HPF circuit 330 configured to set a filtering characteristic dynamically in response to a time-domain value of an amplitude of an input signal, in accordance with an example of the present disclosure. For example, HPF circuit 330 may provide additional details of the system 100 to filter frequency-domain values of an input signal, as illustrated in FIG. 1.

In some examples, the dynamic HPF 330 may make use of spectral inversion, and/or an IIR spectral inversion filter, as in the example of FIG. 2B above. In some examples, dynamic HPF 330 may be an integer filter, so it may be necessary to scale up an input signal, then subsequently scale the output down after filtering, as in the example of FIG. 2B. Accordingly, the dynamic HPF 330 may make use of a scale factor K, achieved by right bit-shifting 346 the signal, to set the corner frequency. The scale up is not shown in the example of FIG. 3B, and may occur, for example, in a previous low-pass filter stage. In some examples, the HPF 330 may use K=1/256, or a right shift 346 of 8 bits, as described below. Alternatively, in some examples, rather than an integer implementation, the HPF 330 may be implemented via a floating-point digital circuit, an analog circuit, in software, or the like, so the scale up and scale down may be unnecessary.

In some examples, the corner frequency of the HPF 330 may be related to the scale factor K and the system's clock period dt. For example, the corner frequency may approximately equal $K/((1-K) 2\pi dt)$. For example, for a right shift 346 of 8 bits and a clock period dt=10 ns, the corner frequency may be approximately 62 kHz.

In some examples, the HPF circuit 330 can include a bypass multiplexer 333, which may select a circuit branch based on an HPF bypass signal. In this example, if the HPF bypass signal selects branch A, the dynamic HPF functionality of circuit 330 may be bypassed. If the HPF bypass signal selects branch B, the dynamic HPF functionality of circuit 330 may be active, that is, the circuit 330 may perform dynamic high-pass filtering, as disclosed herein.

In this example, if the bypass multiplexer 333 selects branch B, the HPF circuit 330 may receive an input signal from the HPF's input line 332. The input signal may be summed in adder 334 (which may also be referred to as a summer) together with the signal from the lower branch of the circuit, similarly to the example of FIG. 2B above. Next in the upper branch of the circuit 330, the input signal may pass through the register 336 before being output to the HPF's output line 338. In some examples, the registers herein may refer to 1/Z blocks, where Z is an impedance. In some examples, the registers may be clocked, whereas other blocks may not be clocked. Note that in some examples, register 336 may be a 24 bit register. Alternatively, any other registers may be used.

In some examples, the circuit 330 may also include one or more additional registers, which may cause a delay in the final output, for example a delay of one clock cycle.

Similarly to the example of FIG. 2B above, along the lower branch of the circuit 330, the inverter 339 can be used to perform subtraction in adder 334, for example via two's complement. Next in the lower branch of the circuit 330, the output of the adder 340 and register 342 can form the signal to be inverted in inverter 339.

In some examples, the lower branch of circuit 330 may include a multiplexer 344, which selects between the circuit branches 346 and 348 based on a control signal A_CTRL 349, which may be set by a user. Branch 346 can carry the bit-shifted output of register 336, while branch 348 can carry the selection of multiplexer 350. In particular, if A_CTRL 349 is set to a first value to disable dynamic corner frequency selection, such as a 0 or Boolean false value, the signal of branch 346 may be propagated through the circuit 330. As in the example of FIG. 2B above, branch 346 can apply a bit shift, such as a right shift by 8 bits with MSb carry, which can correspond to a cutoff frequency, such as approximately 62 kHz. Note that the bit shift 346 may take place between the register 336 and the multiplexer 344. Accordingly, when A_CTRL 349 is set to the first value to disable dynamic corner frequency selection, the circuit 330 may behave like the single-corner HPF circuit 250 of FIG. 2B. By contrast, if A_CTRL 349 is set to a second value to enable dynamic corner frequency selection, such as a 1 or Boolean true value, the signal may continue through branch 348 of the circuit 330 to the multiplexer 350.

Next, in some embodiments, the lower branch can include multiplexer 350, which selects between the circuit branches 352 and 354 and sends this selection to multiplexer 344 in branch 348. In particular, multiplexer 350 may correspond to selector circuit 106 in the example of FIG. 1 above, while branch 352 can correspond to corner frequency adjust-up circuit 108, and branch 354 can correspond to corner frequency adjust-down circuit 110.

Branches 352 and 354 can carry the output of register 336 with two different bit shift values. Note that, in some cases, multiple branches corresponding to multiple corner frequencies are possible. Multiplexer 350 can select a branch in response to the time-domain value of the amplitude of the output signal. For example, multiplexer 350 can select a branch based on comparing the amplitude to a switching threshold, which may be a threshold that enables the system to determine that the unipolar data has arrived.

Figure 3C:
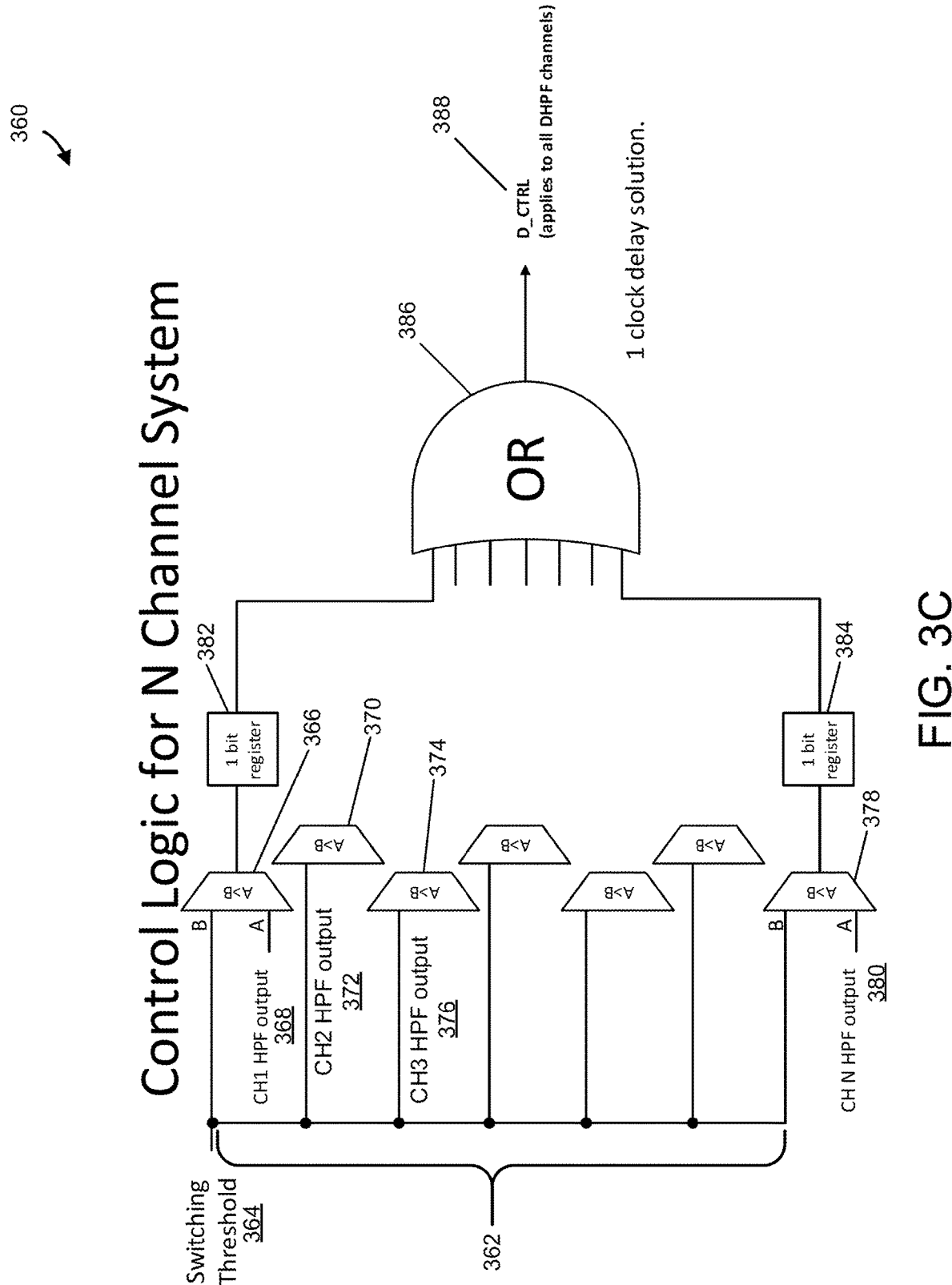
FIG. 3C is a circuit diagram illustrating control logic of a multichannel high-pass filter circuit configured to set a filtering characteristic dynamically in response to time-domain values of amplitudes of multiple signals, in accordance with an example of the present disclosure. This circuit may be configured to deliver the control signal for threshold detection within a single system clock tick, three clock ticks, or another short time interval.

In some examples, the multiplexer 350 selects a branch based on a comparison of the amplitude of the output signal to a threshold, as described in the example of FIG. 3C. Because the output of the filter has a zero baseline, such a comparison to a threshold is both meaningful and practical. By contrast, the input signal may retain a DC component, and therefore cannot be compared meaningfully to a threshold.

Figure 4A:
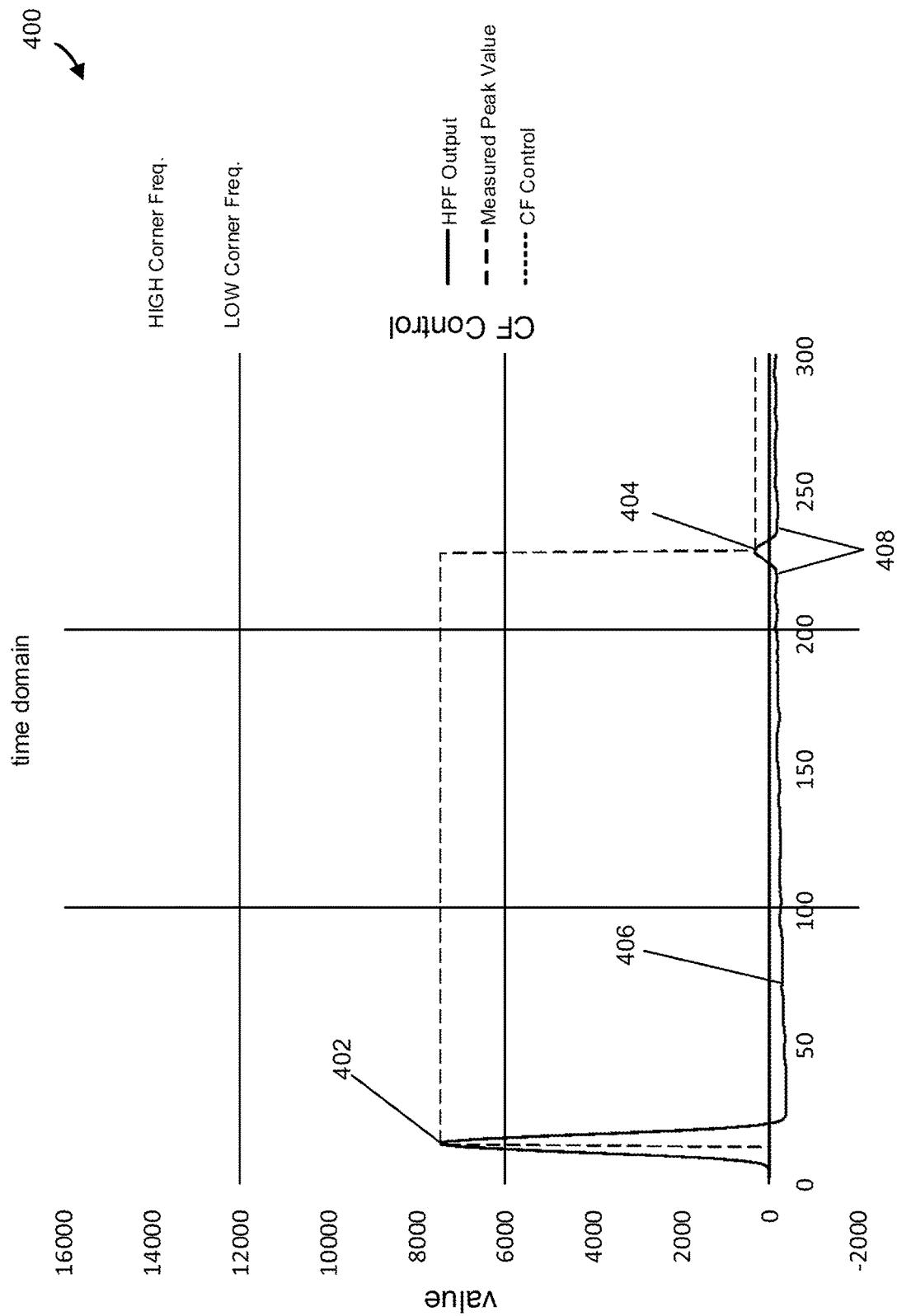
FIG. 4A graphically illustrates a signal filtered with a single corner frequency.
Figure 4B:
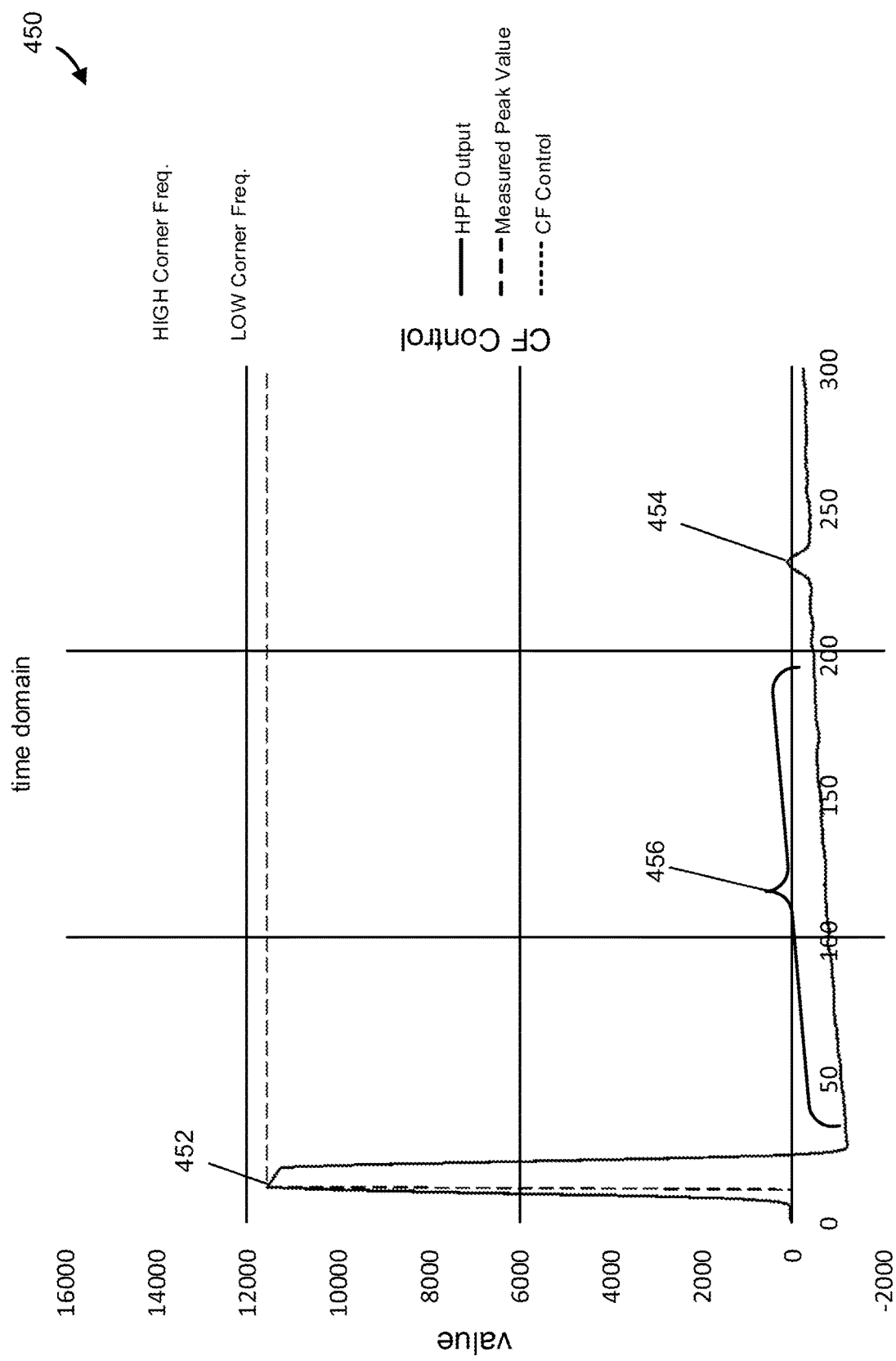
FIG. 4B graphically illustrates slow baseline recovery of a saturated signal filtered with a single corner frequency.

In the examples of FIGS. 4A and 4B below, the switching threshold may have a value such as 9,000 in the units of FIGS. 4A and 4B. In other examples, the switching threshold's value may range between 20 and 2,000. Alternatively or additionally, the threshold can be dynamic, for example the system may determine the threshold value dynamically based on a number of other factors. In some examples, the same switching threshold may be used elsewhere in the disclosed system, so as to maintain consistency with other portions of the system.

The select line of multiplexer 350 can carry a signal D_CTRL 356, which can perform this comparison. For example, D_CTRL 356 may carry a Boolean signal, such as the result of comparing the amplitude to the switching threshold. In various embodiments, e.g. depending on the specific details of an application, the switching threshold may be a fixed value, or may be adjusted by the system in response to other criteria. In some examples, the comparison may be made in absolute value, for example the absolute value of the signal amplitude can be compared to the switching threshold.

If multiplexer 350 selects branch 352, the bit-shifted signal of branch 352 can then be propagated through the circuit, for example branch 352 may apply a right shift by 5 bits with MSb carry. This can correspond to setting a higher value for the HPF cutoff frequency, such as 500 kHz or 600 kHz. As a result, the baseline value of the signal will recover more quickly. Multiplexer 350 can select branch 352 if the amplitude of the output signal 338 is lower than the switching threshold.

If multiplexer 350 selects branch 354, the bit-shifted signal of branch 354 can then be propagated through the circuit, for example branch 354 may apply a right shift by 12 bits with MSb carry. This can correspond to setting a lower value for the HPF cutoff frequency, for example 200 Hz or 4 kHz. As a result, the accuracy of the signal will be better preserved. Multiplexer 350 can select branch 354 if the amplitude of the output signal 338 is greater than the switching threshold.

The filtered signal may then pass to the HPF output line 338. In particular, the signal may be filtered so that components (i.e., frequency-domain values) of the input signal with frequencies below the selected cutoff frequency are attenuated. Because the circuit 330 can select the cutoff frequency dynamically in response to the input signal, circuit 330 can filter the input signal while still preserving the accuracy of the signal above the cutoff frequency, and providing prompt recovery of the signal's baseline value. In particular, when the output signal amplitude 338 is greater than the switching threshold, the system can set a low cutoff frequency so that most frequency components of the input signal are retained, and thus the shape and quantitative value of the signal are likely preserved. Conversely, when the output signal amplitude is less than the threshold, the system may set a high cutoff frequency so that lower-frequency (longer-period) artifacts are filtered out, leading to faster baseline recovery.

FIG. 3C is a circuit diagram illustrating control logic 360 of a multichannel high-pass filter circuit configured to set a filtering characteristic dynamically in response to time-domain values of amplitudes of multiple signals 362, in accordance with an example of the present disclosure. In this example, a single switching threshold signal 364 may be compared to all the channels 362 via comparators. Alternatively or additionally, multiplexers can be used to compare the switching threshold signal 364 to the channels 362. For example, comparator 366 can select between the channel 1 HPF output 368 and switching threshold signal 364 by comparing their values. Likewise, comparator 370 can select between the channel 2 HPF output 372 and switching threshold signal 364, comparator 374 can select between the channel 3 HPF output 376 and switching threshold signal 364, and comparator 378 can select between the channel N HPF output 380 and switching threshold signal 364. In some examples, these comparisons may be made in absolute value, for example in the case of a bipolar input signal, the absolute magnitude of a respective channel amplitude may be compared to the switching threshold signal 364.

Subsequently, the output from the multiplexers can pass to OR gate 386, which can determine whether the signal from any of the channels is greater than the switching threshold. The output from OR gate 386 can be passed to D_CTRL 388, which can be used to select a corner frequency, as in the example of FIG. 3B above. As a result, if the amplitude of the signal from any of the channels exceeds the switching threshold, the system can adjust the corner frequency for HPF, e.g. by lowering it. In some examples, all the channels 362 of a multiple channel system 360 may adjust corner frequencies simultaneously. In some examples, the circuit 360 is configured to deliver the control signal 388 for threshold detection within a short time interval after any amplitude exceeds the threshold, for example within a single system clock tick, three clock ticks, 25 ns, 100 ns, or 1 us of the threshold being crossed.

As noted above, in various examples, the disclosed system and methods may be designed with the time interval sufficiently short, in that a signal baseline is preserved allowing unipolar data measurement consistent with application requirements and/or a predetermined accuracy threshold, which may be based on such application requirements. In an example where such a performance and/or accuracy threshold is looser, a longer time interval may be chosen, thereby enabling the use of a lower corner frequency. For example, for some precision guidance and sensing applications, a very high performance and/or accuracy may be required, such that the time interval is 1 clock tick of a system clock, or less. In another example, the disclosed system and methods may be implemented within a mechanical shock absorption system, therefore the time interval may be 100 milliseconds or 10 milliseconds. In yet another example, the disclosed system and methods may be used to filter radio-frequency data, and therefore the time interval may be of order 100 nanoseconds or 10 nanoseconds.

In particular, the circuit 360 may deliver the control signal 388 for threshold detection within a short enough time interval so that switching the corner frequency may take place fast enough to preserve the baseline and ensure accurate measurement. In some examples, the desired level of accuracy may be a function of the performance needs of a particular application. Accordingly, in some cases, a trade-off or optimization may be made between corner frequency selection and the switching time interval.

In addition to the analog and digital examples of FIGS. 3A-3C above, in some examples, the disclosed dynamic filter system and methods may also be implemented within a mechanical system. For example, the disclosed system and methods may be implemented within a shock absorption system, for example in shock absorbers on a car or other vehicle. In an example, the disclosed dynamic filter system and methods may provide fast response when a rough road shock absorption response is occurring, and may provide slow response when the road is smooth. In another example, the disclosed dynamic filter system and methods may be used within a car's suspension system. For example, if a car or other vehicle is driven through a pothole or over a bump, the suspension may react fast enough to avoid the perturbance being felt in the car.

Alternatively or additionally, the disclosed dynamic filter may also be implemented in various other systems, such as via a floating-point digital circuit, an analog circuit, and/or in software. For example, a software HPF may be configured with a variable filtering characteristic, such as a variable corner frequency, that can be adjusted dynamically in response to a time-domain value of an amplitude of an output signal of the software HPF. In one such example, such a software HPF may sample its input and/or output signals at high rates (for example, with Nyquist frequencies of 10 MHz, 50 MHz, 100 MHz, 200 MHz, or higher). The software HPF may adjust the filtering characteristic or corner frequency dynamically within a brief time of the amplitude of the output signal crossing above or below the threshold value, such as within 1 sampling period of such a crossing, within 3 sampling periods of a crossing, within 10 sampling periods, or the like.

Comparative Results

FIG. 4A graphically illustrates a signal 400 filtered with a single corner frequency. In particular, signal 400 may be filtered with an HPF with a single static corner frequency. As shown, the peak 402 has a measured height of 7,462 units, whereas the ideal height of peak 402 is 7,520 units. Accordingly, peak 402 is measured at approximately 99% of its correct height. Thus, while peak 402 is relatively tall in this example, it may not be so tall as to saturate the HPF. Accordingly, filtered signal 400 may be referred to as a nominal output of the HPF. Peak 402 retains a relatively accurate shape compared to the input signal.

As shown, the baseline 406 remains depressed following the peak 402. This results in reduced accuracy of the smaller peak 404. For example, as shown, the height of peak 404 is 342 units above the horizontal axis, but the baseline 408 near peak 404 remains slightly below the horizontal axis. In this example, the ideal height of peak 404 is 492 units. Thus the apparent height of peak 404 may be somewhat erroneously reduced to approximately 70% of its correct value, due to the depression of baseline 408, causing slight data corruption of peak 404. Still, the signal baseline does moderately recover after peak 402. As a result, the smaller peak 404 can be measured with 70% of the correct height relative to the baseline.

FIG. 4B graphically illustrates slow baseline recovery of a saturated signal 450 filtered with a single corner frequency. As in the example of FIG. 4A, signal 450 may be filtered with an HPF with a single static corner frequency. As shown, the peak 452 has a height of 11,436 units, whereas the ideal height of peak 452 is 11,484 units. Thus, in this example, peak 452 is taller than peak 402 of FIG. 4A, such that the HPF may become saturated. As shown, due to the HPF being saturated, peak 452 may have an inaccurate shape compared to the input signal. For example, the height of peak 452 may be reduced due to the HPF's modification of the frequency content of the data signal. Moreover, the top of peak 452 is sloping, whereas the corresponding peak of the input signal may be smoother and concave downward, with approximate symmetry about its apex. Such an inaccurately sloping shape of peak 452 may be a flaw of the saturated filtered signal 450.

Furthermore, the base of the smaller peak 454 is at a negative amplitude value, while the apex of peak 454 is close to zero. As a result, the peak 454 is difficult to measure, and could be missed, for example by an automated peak locator, whereas the ideal height of peak 454 is 500 units. Such a difficulty may be caused by the signal baseline 456 failing to recover quickly enough after the larger peak 452. The baseline 456 remains well below zero throughout much of the displayed domain of the signal 450, resulting in an incorrect baseline of peak 454. This may be another flaw of the filtered signal 450. The disclosed system and methods can address such issues by selecting a corner frequency dynamically so as to minimize saturation, as disclosed herein.

Figure 5A:
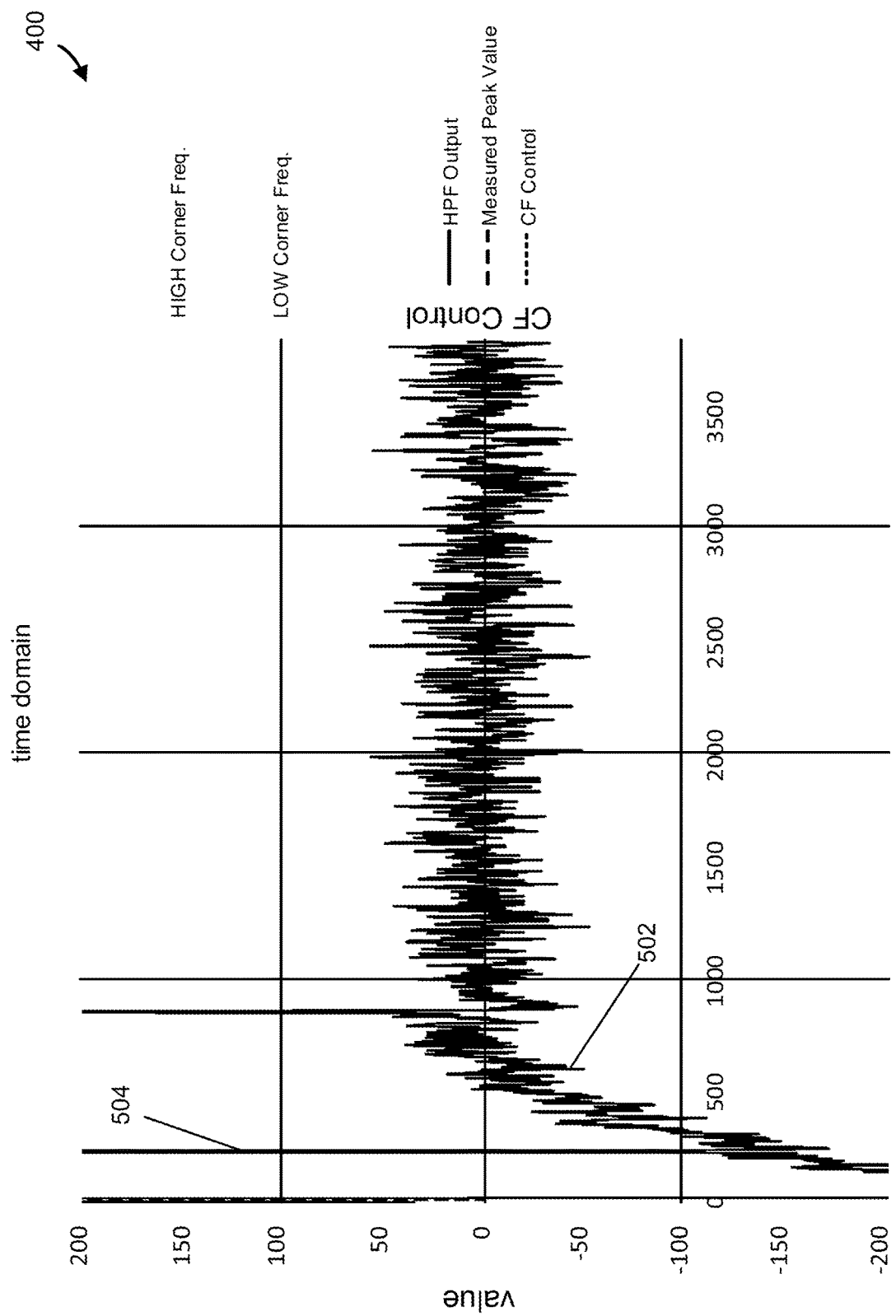
FIG. 5A graphically illustrates further details of a signal filtered with a single corner frequency.

FIG. 5A graphically illustrates further details of a signal 400 filtered with a single corner frequency. In this example, the signal 400 is a detailed view of the signal 400 from FIG. 4A above, with the vertical axis expanded and the horizontal axis contracted. The peak 504 shown in this example corresponds to the peak 404 of FIG. 4A. As in the example of FIG. 4A above, the output from the HPF may be in the nominal regime. As shown, signal 400 can still have a slow recovery 502 of the baseline value. However, as in the example of FIG. 4A above, the slowness of recovery 502 is less severe than in the saturated case. For example, overall baseline recovery times (before the baseline's value is dominated by noise) are shown as approximately 800 (in arbitrary units) in this example with a nominal signal, and approximately 2200 for the saturated signal in the example of FIG. 5B below.

Figure 5B:
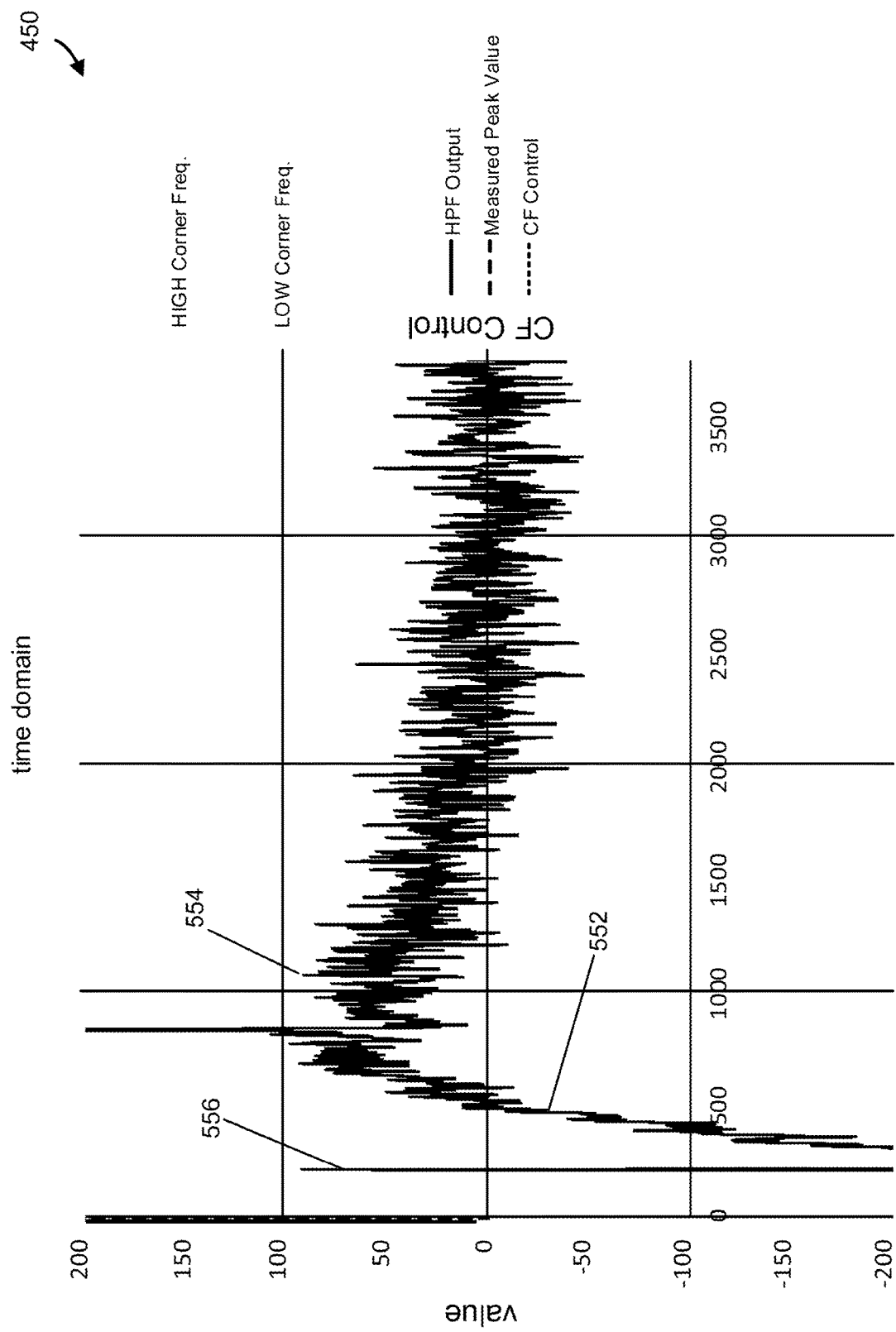
FIG. 5B graphically illustrates further details of slow baseline recovery of a saturated signal filtered with a single corner frequency.

FIG. 5B graphically illustrates further details of slow baseline recovery of a saturated signal filtered with a single corner frequency. In this example, the signal 450 is a detailed view of the signal 450 from FIG. 4B above, with the vertical axis expanded and the horizontal axis contracted. The peak 556 shown in this example corresponds to the peak 454 of FIG. 4B. As in the example of FIG. 4B above, the output from the HPF may be saturated. As a result, signal 450 has an even slower recovery 552 of the baseline value than the nominal signal of FIG. 5A above. For example, the overall baseline recovery times are shown as approximately 2200 (in arbitrary units) in this example with a saturated signal, compared to approximately 800 for the nominal signal in the example of FIG. 5A.

Moreover, a residual data artifact 554 dominates the baseline recovery process 552. In particular, even though the slowly-recovering baseline 552 remains below zero prior to the artifact, the data artifact 554 then spuriously brings the signal 450 above zero. Thus, in effect, the baseline does not fully recover to zero until a time of 2700.

Figure 6A:
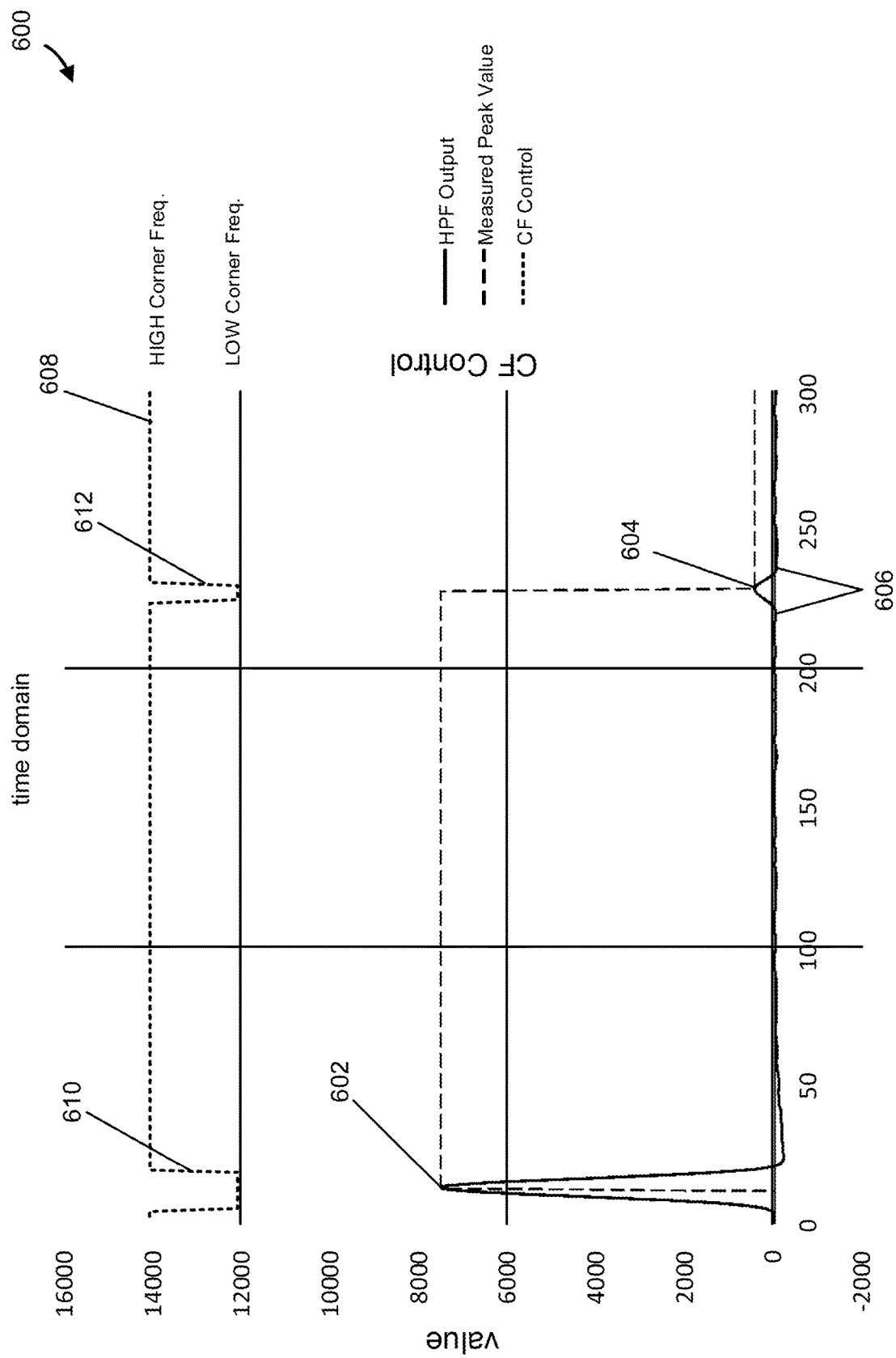
FIG. 6A graphically illustrates a signal filtered with a dynamically-set corner frequency, in accordance with an example of the present disclosure.

FIG. 6A graphically illustrates a signal 600 filtered with a dynamically-set corner frequency, in accordance with an example of the present disclosure. Signal 600 may be based on the same input data as signal 400 in the example of FIG. 4A, but is filtered with a dynamic corner frequency rather than a single corner frequency. In particular, the peak 602 is shown to have a height of 7,480, similar to the height of peak 402 of FIG. 4A. In this example, the peak 602 has an accurate shape, while the smaller peak 604 can be measured with a correct height of approximately 459 units, as shown, because the baseline has recovered. In particular, the baseline 606 near smaller peak 604 lies very close to the horizontal axis, as shown. As a result, the disclosed system and methods have improved the accuracy of peak measurement from approximately 70% of the correct height, as in the example of FIG. 4A, to approximately 93% of the correct height in this example.

In addition, FIG. 6A shows a control signal 608, which can correspond to a control signal to switch a multiplexer, such as multiplexer 350 of FIG. 3B, in response to the signal 600. For example, control signal 608 can correspond to D_CTRL 356 of the example of FIG. 3B, or D_CTRL 388 of the example of FIG. 3C. In this example, the threshold has been set to 300 units, i.e. the control signal 608 instructs the multiplexer to switch to the low corner frequency when the time-domain amplitude of signal 600 exceeds 300 units. As a result, as shown, the control signal 608 can instruct the multiplexer to switch to a low corner frequency during times 610 and 612 that correspond to peaks 602 and 604, respectively. At other times, the control signal 608 can indicate to remain at a high corner frequency. By switching the multiplexer, the control signal 608 can recover the baseline promptly, while maintaining good signal quality of peaks 602 and 604.

Figure 6B:
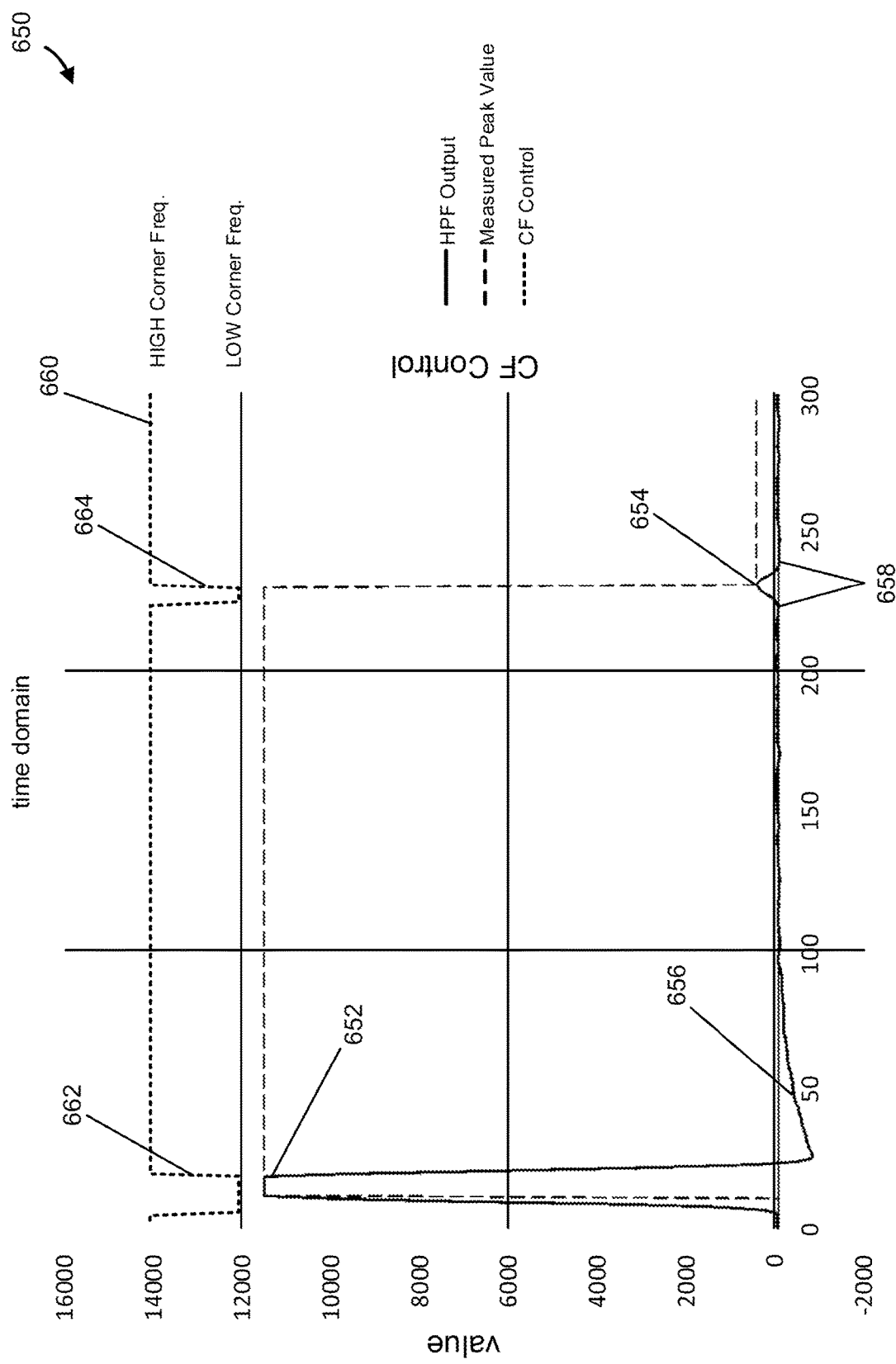
FIG. 6B graphically illustrates baseline recovery of a saturated signal filtered with a dynamically-set corner frequency, in accordance with an example of the present disclosure.

FIG. 6B graphically illustrates baseline recovery of a saturated signal 650 filtered with a dynamically-set corner frequency, in accordance with an example of the present disclosure. Signal 650 may be based on the same input data as signal 450 in the example of FIG. 4B, but is filtered with a dynamic corner frequency rather than a single corner frequency. In particular, in this example, the peak 652 is shown to have a height of 11,463, similar to the height of peak 452 of FIG. 4B above. Thus, in this example, the peak 652 is quite tall, such that the HPF may become saturated, as in the example of FIG. 4B. Still, using the disclosed dynamic filtering system and methods, the peak 652 retains a more accurate shape. In particular, the top of peak 652 is substantially flat, in contrast with sloped peak 452 of FIG. 4B.

In addition, the smaller peak 654 can be measured with the correct height of approximately 488 units, as shown, because the baseline 656 has recovered. In particular, the smaller peak 654 has been measured with 98% of its ideal height of 500 units, by contrast to the case of FIG. 4B using a single frequency HPF, where the height of the small peak 454 is too low to be detectable. Note that, due to noise, the peaks may be measured below or even above their ideal height, but in this example, the measured height remained below the ideal. Moreover, as shown, the baseline 656 recovers to zero much more quickly than baseline 456 in the example of FIG. 4B. Note that the time spent with the baseline below zero is significantly reduced.

As a result, the baseline 658 of peak 654 corresponds to a value near zero, so that the height of peak 654 can be measured correctly, in contrast with the case of peak 454 in FIG. 4B. By significantly improving baseline recovery time, the disclosed system and methods reduce the lag time required to recover from saturated peak 652 before the system is prepared to measure the subsequent signal 654.

In addition, FIG. 6B shows a control signal 660, which can correspond to a control signal to switch a multiplexer, such as multiplexer 350 of FIG. 3B, in response to the signal 650. In this example, the threshold for switching to a low corner frequency has been set to a time-domain amplitude of signal 650 exceeding 300 units. As a result, as shown, the control signal 660 can instruct the multiplexer to switch to a low corner frequency during times 662 and 664 that correspond to peaks 652 and 654, respectively. At other times, the control signal 660 can indicate to remain at a high corner frequency. Accordingly, the control signal 660 can recover the baseline promptly, while maintaining good signal quality of peaks 652 and 654.

Figure 7A:
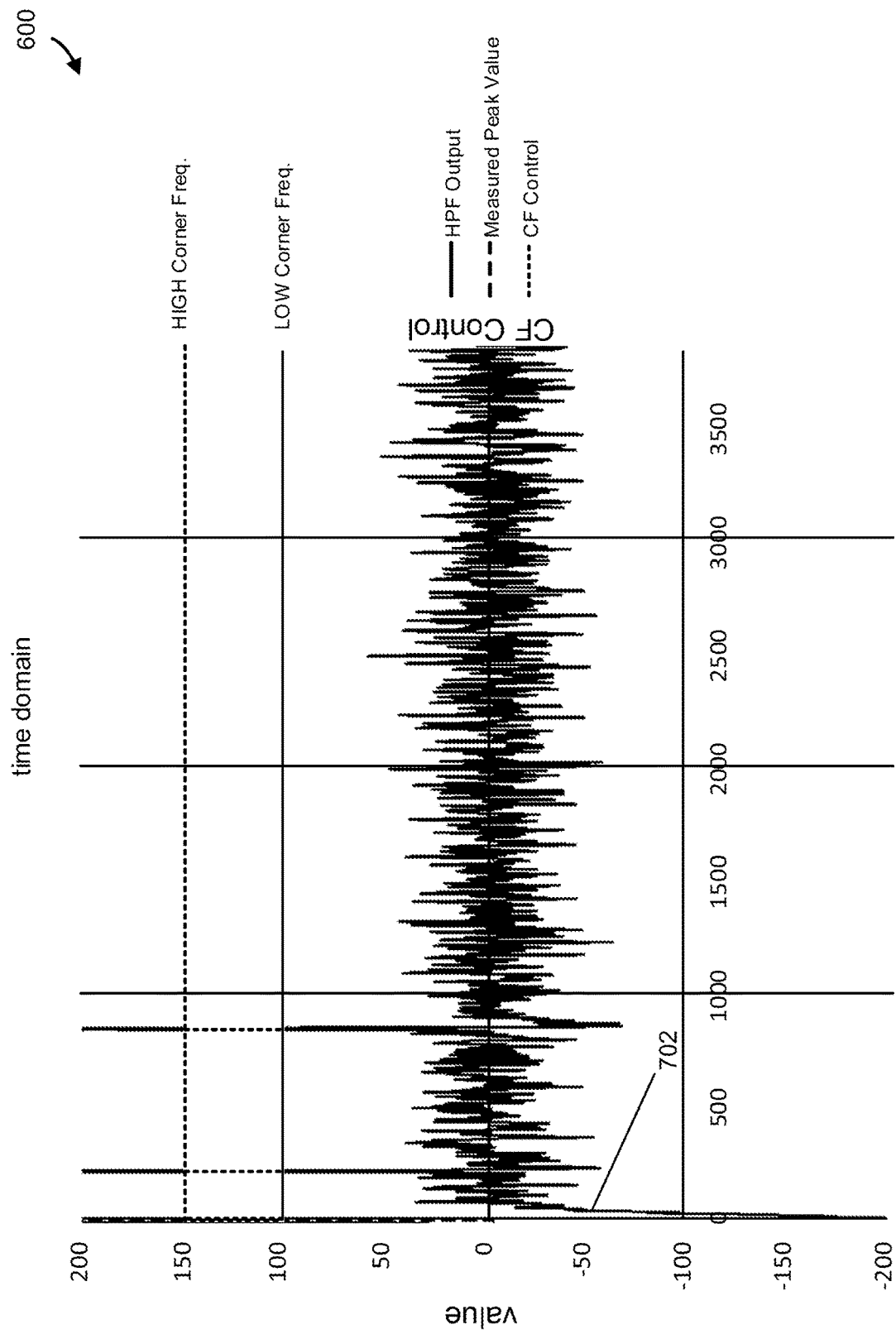
FIG. 7A graphically illustrates further details of a signal filtered with a dynamically-set corner frequency, in accordance with an example of the present disclosure.

FIG. 7A graphically illustrates further details of a signal 600 filtered with a dynamically-set corner frequency, in accordance with an example of the present disclosure. In this example, the signal 600 is a detailed view of the signal 600 from FIG. 6A above, with the vertical axis expanded and the horizontal axis contracted. As in the example of FIG. 5A above, the signal 600 output from the HPF in this example may be in the nominal regime. However, using the disclosed system and methods to set the corner frequency dynamically, the baseline in this example can recover 702 significantly faster than the case with a single corner frequency shown in FIG. 5A. As shown, the baseline 702 of signal 600 does not lag below zero for an appreciable length of time. In particular, the overall baseline recovery times (until the baseline's value is dominated by noise) are shown as approximately 50 (in arbitrary units) for the nominal peak in this example, compared to approximately 800 for the nominal signal in the example of FIG. 5A above.

Figure 7B:
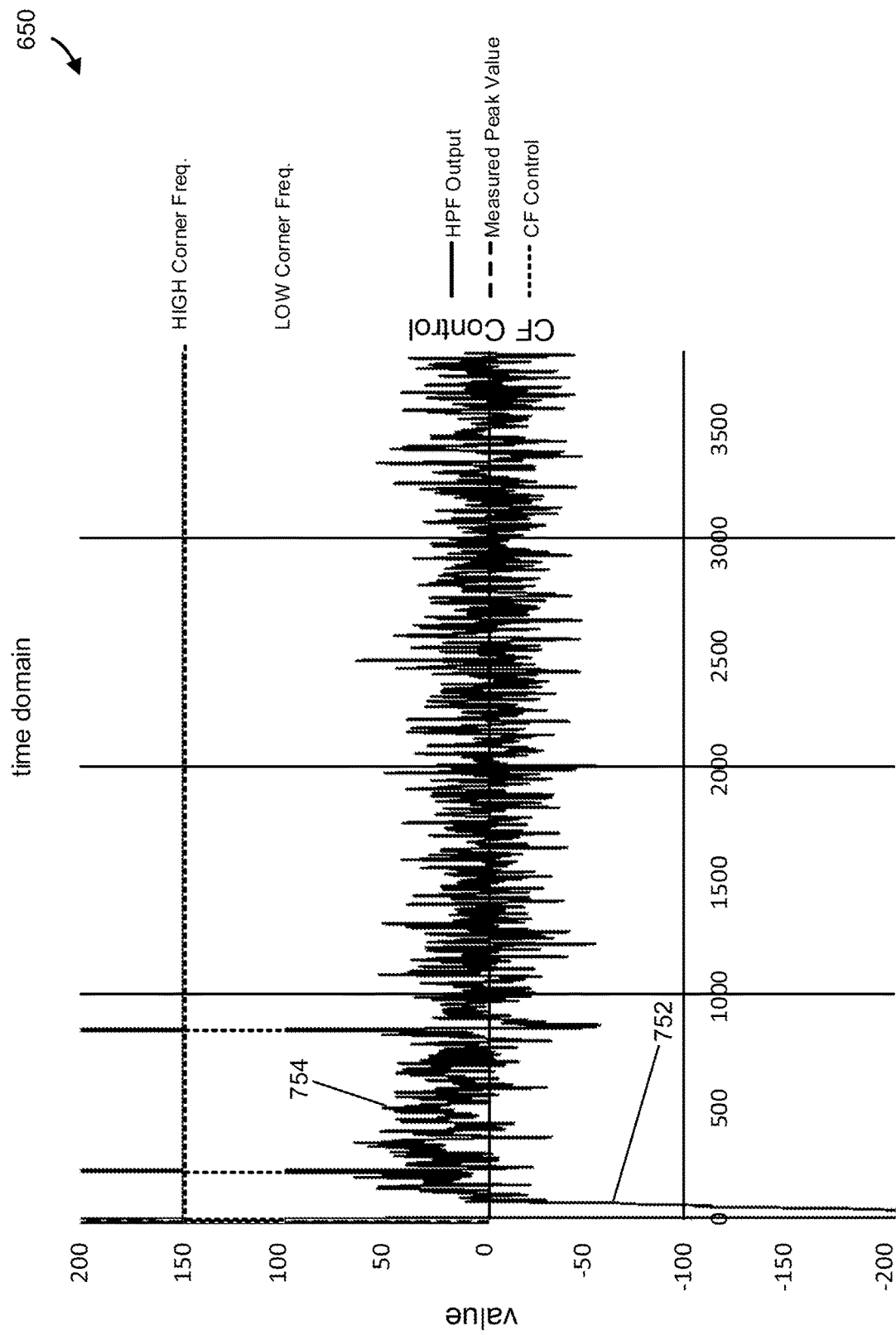
FIG. 7B graphically illustrates further details of baseline recovery of a saturated signal filtered with a dynamically-set corner frequency, in accordance with an example of the present disclosure.

FIG. 7B graphically illustrates further details of baseline recovery of a saturated signal 650 filtered with a dynamically-set corner frequency, in accordance with an example of the present disclosure. In this example, the signal 650 is a detailed view of the signal 650 from FIG. 6B above, with the vertical axis expanded and the horizontal axis contracted. In this example, the magnitude of the residual data artifact 754 is significantly reduced compared with artifact 554 in the example of FIG. 5B. In particular, when the output signal amplitude is greater than the switching threshold, the system can set a low cutoff frequency for filtering. Such a low cutoff frequency can result in most frequency components of the input signal being retained, and therefore is likely to preserve the shape and quantitative value of the signal. For example, the peak values of the spurious residual data artifact 754 are about half the magnitude of artifact 554. In addition, the time span of residual data artifact 754 is five times briefer than artifact 554.

In this example, the filtered signal's baseline 752 also recovers significantly faster than in the case of a single corner frequency. When the output signal amplitude is less than the switching threshold, the system may set a high cutoff frequency for filtering. Such a high cutoff frequency can result in low-frequency components of the input signal being filtered out, and therefore low-frequency artifacts that take a long time to be corrected are likely to be missing from the filtered signal 650. As shown in this example, the overall time for baseline recovery 752 is approximately 700 (in arbitrary units) after the saturated peak, compared to approximately 2200 for the saturated signal in the example of FIG. 5B above.

Methods

Figure 8A:
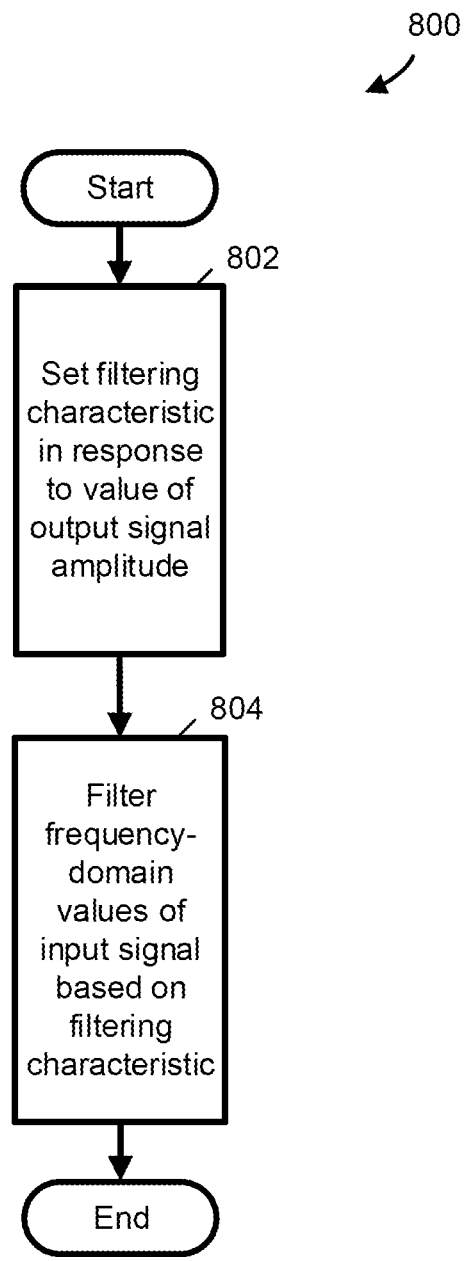
FIG. 8A is a flow diagram illustrating a method of dynamically filtering frequency-domain values, in accordance with an example of the present disclosure.

FIG. 8A is a flow diagram illustrating a method 800 of dynamically filtering frequency-domain values, in accordance with an example of the present disclosure. In various examples, method 800 may be performed with an HPF circuit, such as the dynamic HPF circuits in the examples of FIGS. 3A, 3B, and 3C above.

As shown in FIG. 8A, dynamically filtering frequency-domain values starts with setting 802 a filtering characteristic in response to a time-domain value of an output signal amplitude. For example, the filtering characteristic can include a cutoff or corner frequency for filtering frequency-domain values, such as with an HPF, a low-pass filter, a bandpass filter, or another filter. In some examples, the system can adjust the filtering characteristic within a time interval (for example, within 25 ns, 100 ns, or 1 µs) after the signal amplitude crosses a predefined threshold value. The threshold value may be a fixed value, or may be adjusted by the system based on additional criteria. In some cases, the time interval may be several clock ticks, such as 3 or 4 clock ticks. This may correspond to a nearly immediate time interval, for example less than nanoseconds, or less than 50 nanoseconds. In another example, the time interval is less than 1 microsecond.

Next, dynamically filtering frequency-domain values continues with filtering 804 frequency-domain values of the input signal amplitude based on the filtering characteristic. For example, filtering 804 the frequency-domain values can include using an HPF, a low-pass filter, a bandpass filter, or another filter with a cutoff or corner frequency corresponding to the filtering characteristic. In the case of an HPF, filtering 804 the frequency-domain values can include filtering out frequency components at frequencies lower than the filtering characteristic, e.g. a cutoff or corner frequency. Alternatively, in the case of a low-pass filter, filtering 804 the frequency-domain values can include filtering out frequencies above the filtering characteristic, e.g. a cutoff or corner frequency. In the case of a bandpass filter, filtering 804 the frequency-domain values can include filtering out frequencies outside of a band or range. For example, the filtering characteristic may include a lower cutoff of the band or range, a higher cutoff of the band or range, or both. The bandpass filter may then filter 804 out frequencies below the lower cutoff frequency and/or above the higher cutoff frequency.

Figure 8B:
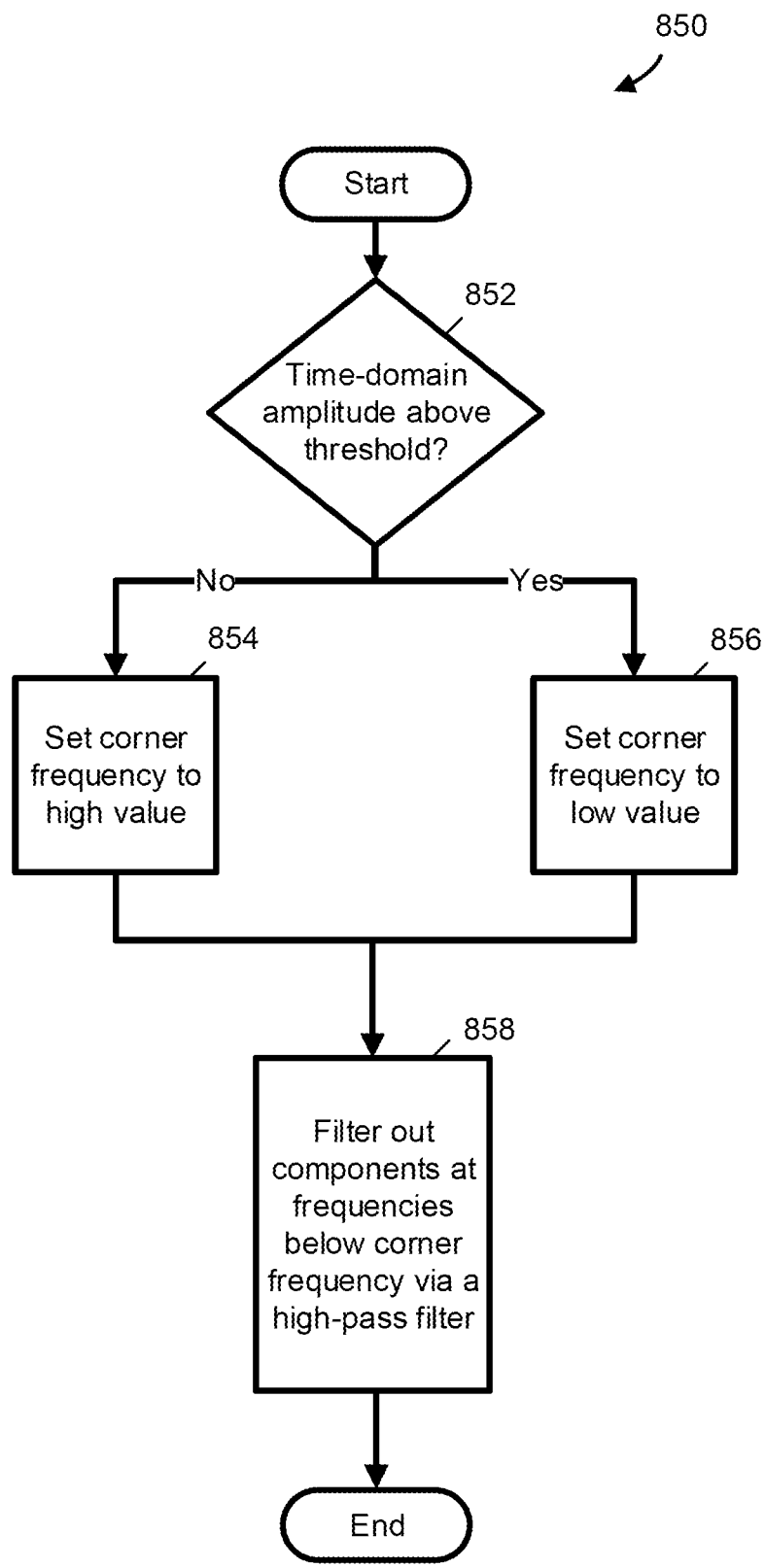
FIG. 8B is a flow diagram illustrating a method of dynamically filtering frequency-domain values based on a time-domain amplitude of an output signal, in accordance with an example of the present disclosure.

FIG. 8B is a flow diagram illustrating a method 850 of dynamically filtering frequency-domain values based on a time-domain amplitude of an output signal, in accordance with an example of the present disclosure. In various examples, method 850 may be performed with an HPF circuit, such as the dynamic HPF circuits in the examples of FIGS. 3A, 3B, and 3C above. In some examples, method 850 illustrates a single cycle of evaluation of the output signal, and may repeat at a high frequency, for example the method may repeat with every clock tick of the system.

As shown in FIG. 8B, dynamically filtering frequency-domain values based on a time-domain amplitude starts with determining 852 whether a time-domain value of an output signal amplitude is above a threshold. For example, a multiplexer can select a branch based on comparing the amplitude to a switching threshold, as in FIG. 3B above. For example, the select line of the multiplexer can be based on a Boolean comparison signal D_CTRL, which may compare the amplitude to the switching threshold. In the case of a multi-channel signal, the comparison signal D_CTRL may be the result of comparing all the signals to a threshold, as in FIG. 3C above. In some examples, this comparison may be performed by one or more comparators, as in FIG. 3C. In some examples, the disclosed system is configured to deliver the control for threshold detection within a short interval after a crossing of the threshold, for example within a single clock tick, three clock ticks, 25 ns, 100 ns, or 1 us of a crossing.

In some cases, the system may compare the signal amplitude to multiple thresholds, for example to set multiple values of the HPF corner frequency.

Next, if the time-domain value of a signal amplitude is below the threshold, dynamically filtering frequency-domain values continues with setting 854 the corner frequency to a high value, for example 500 kHz or 600 kHz. In particular, this situation may correspond to the nominal case illustrated in FIG. 6A above. By determining that the signal amplitude is below the threshold, the system may determine that the signal is not saturated. Accordingly, setting 854 a high value of the HPF corner frequency results in filtering out many low-frequency components of the signal. However, as a signal below the threshold is not large enough to saturate the HPF, the baseline value is still expected to recover after filtering.

If the time-domain value of an output signal amplitude is above the threshold, dynamically filtering frequency-domain values continues with setting 856 the corner frequency to a low value, for example 200 Hz or 4 kHz. In particular, this situation may correspond to the saturated case illustrated in FIG. 6B above. By determining that the signal amplitude is above the threshold, the system may determine that the signal is saturated. Accordingly, setting 856 a low value of the HPF corner frequency results in retaining most frequency components of the signal, including many low-frequency components. As a result, even when an initial signal peak saturates the HPF, the baseline value can still recover quickly after filtering due to the low corner frequency. Moreover, by setting 856 a low value of the corner frequency, the system can improve the accuracy of the signal shape compared with the single-corner HPF.

The system can set the corner frequency by selecting a branch of a circuit. For example, the system can select a circuit branch with a bit shift as in FIG. 3B above, or with other circuitry (e.g., analog electronics) configured to set the cutoff frequency. The system can select the appropriate circuit branch in response to the time-domain signal amplitude, and the bit shift or other circuitry corresponding to the selected branch can then set the cutoff frequency. Note that the selection of a cutoff frequency can change dynamically as the signal's amplitude varies in the time domain. For example, in some embodiments, the system can adjust the cutoff frequency within a time interval after each occasion when the signal amplitude crosses either above or below the threshold, for example, within 25 ns, 100 ns, or 1 us of each crossing. In some cases, the system is configured to dynamically change the corner frequency within a time interval after the time-domain value of the amplitude crosses a threshold value. In some cases, the time interval may be several clock ticks, such as 3 or 4 clock ticks. This may correspond to a nearly immediate time interval, for example less than 40 nanoseconds, or less than 50 nanoseconds. In another example, the time interval is less than 1 microsecond.

In an embodiment where the system uses multiple thresholds, the system can select among multiple circuit branches to set the appropriate cutoff frequency. For example, if there are N cutoff frequencies resulting in (N+1) amplitude ranges, the system can then select among (N+1) circuit branches corresponding to (N+1) cutoff frequencies.

Next, the system can filter out 858 components at frequencies below the corner frequency. For example, the system can use an HPF to filter out the low-frequency components. In some embodiments, the system can use another type of filter to filter out other ranges of frequency components. For example, the system may use a low-pass filter to filter out frequencies above a cutoff frequency, or may use a bandpass filter to filter out frequencies outside of a band or range.

The foregoing description of the embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

The invention claimed is:

1. A system comprising:
a high-pass filter configured to filter frequency-domain values of an input signal based on a filtering characteristic, wherein the filtering characteristic is set dynamically in response to a time-domain value of an amplitude of an output signal;
wherein the filtering characteristic comprises a corner frequency, and the system includes a high-pass filter configured to filter out frequency components at frequencies lower than the corner frequency; and
wherein the system is configured to dynamically change the corner frequency from a first value to a second value, in response to the time-domain value of the amplitude falling below a threshold value having a first tolerance, the second value being greater than the first value;
wherein the system is configured to dynamically change the corner frequency from a first value to a second value, in response to the time-domain value of the amplitude rising above a threshold value having second tolerance, the second value being lower than the first value; and
wherein the first and second tolerances are not equal.

2. The system of claim 1, wherein the system is configured to dynamically change the corner frequency within a time interval after the time-domain value of the amplitude crosses a threshold value.

3. The system of claim 2, wherein:
the time interval is less than 1 microsecond;
the time interval is 3 clock ticks of a system clock, or less; or
the time interval is sufficiently short, in that a signal baseline is preserved allowing unipolar data measurement consistent with a predetermined accuracy threshold.

4. The system of claim 1, wherein:
the system is a multi-channel system;
the amplitude is a respective amplitude of a plurality of amplitudes corresponding to a plurality of signals; and
the system is configured, responsive to a respective value of any of the plurality of amplitudes crossing a threshold value, to set the filtering characteristic.

5. The system of claim 1, wherein:
the output signal is a digital output signal; and
to filter the frequency-domain values comprises to bit shift the digital output signal.

6. The system of claim 5, comprising a multiplexer configured to dynamically select a bit shift value based on the amplitude of the output signal.

7. The system of claim 1, wherein:
the output signal is an analog output signal; and
to set the filtering characteristic comprises to set a switch state based on an output of a comparator comparing the time-domain value of the amplitude with a threshold voltage.

8. The system of claim 1, wherein the filtering characteristic comprises a corner frequency, and the system includes a low-pass filter configured to filter out frequency components at frequencies higher than the corner frequency.

9. A method of filtering frequency-domain values, comprising:
setting a filtering characteristic dynamically in response to a time-domain value of an amplitude of an output signal;
filtering frequency-domain values of an input signal based on the dynamically-set filtering characteristic;
wherein the filtering characteristic comprises a corner frequency, and filtering the frequency-domain values includes filtering out, via a high-pass filter, frequency components at frequencies lower than the corner frequency;
wherein setting the filtering characteristic dynamically comprises changing the corner frequency dynamically from a first value to a second value, in response to the time-domain value of the amplitude falling below a threshold value having a first tolerance, the second value being greater than the first value; or
setting the filtering characteristic dynamically comprises changing the corner frequency dynamically from a first value to a second value, in response to the time-domain value of the amplitude rising above a threshold value having a second tolerance, the second value being lower than the first value.

10. The method of claim 9, further comprising:
receiving a plurality of signals, wherein the amplitude is a respective amplitude of a plurality of amplitudes corresponding to the plurality of signals; and
setting, responsive to a respective value of any of the plurality of amplitudes crossing a threshold value, the filtering characteristic.

11. The method of claim 9, wherein:
the input signal is a digital input signal received by a computing device;
setting the filtering characteristic dynamically comprises setting, by the computing device, the filtering characteristic dynamically;

filtering frequency-domain values of the input signal comprises filtering, by the computing device, frequency-domain values of the input signal.

* * * * *